US011132737B2

(12) United States Patent
Glaser et al.

(10) Patent No.: US 11,132,737 B2
(45) Date of Patent: Sep. 28, 2021

(54) DYNAMIC CUSTOMER CHECKOUT EXPERIENCE WITHIN AN AUTOMATED SHOPPING ENVIRONMENT

(71) Applicant: Grabango Co., Berkeley, CA (US)

(72) Inventors: William Glaser, Berkeley, CA (US); Brian Van Osdol, Piedmont, CA (US)

(73) Assignee: Grabango Co., Berkeley, CA (US)

( * ) Notice: Subject to any disclaimer, the term of this patent is extended or adjusted under 35 U.S.C. 154(b) by 163 days.

(21) Appl. No.: 15/893,609

(22) Filed: Feb. 10, 2018

(65) Prior Publication Data

US 2018/0232796 A1 Aug. 16, 2018

Related U.S. Application Data

(60) Provisional application No. 62/457,656, filed on Feb. 10, 2017, provisional application No. 62/523,183, filed on Jun. 21, 2017.

(51) Int. Cl.
*G06Q 30/00* (2012.01)
*G06Q 30/06* (2012.01)
*G06Q 90/00* (2006.01)
*G06Q 40/00* (2012.01)

(52) U.S. Cl.
CPC ..... *G06Q 30/0635* (2013.01); *G06Q 30/0601* (2013.01); *G06Q 30/0641* (2013.01); *G06Q 40/12* (2013.12); *G06Q 90/20* (2013.01)

(58) Field of Classification Search
CPC ........... G06Q 30/0635; G06Q 30/0601; G06Q 30/0641; G06Q 90/20; G06Q 40/12
See application file for complete search history.

(56) References Cited

U.S. PATENT DOCUMENTS

| 5,254,853 | A  | 10/1993 | Reich |
| 5,418,567 | A  | 5/1995  | Boers et al. |
| 5,502,564 | A  | 3/1996  | Ledger |
| 6,970,183 | B1 | 11/2005 | Monroe |
| 6,996,460 | B1 | 2/2006  | Krahnstoever et al. |
| 7,053,915 | B1 | 5/2006  | Jung et al. |
| 7,195,157 | B2 | 3/2007  | Swartz et al. |
| 7,225,414 | B1 | 5/2007  | Sharma et al. |
| 7,227,976 | B1 | 6/2007  | Jung et al. |

(Continued)

FOREIGN PATENT DOCUMENTS

| EP | 3454698 A1 | 3/2019 |
| WO | 2019032304 A1 | 2/2019 |

OTHER PUBLICATIONS

"An End to the Checkout Line?" by Jing Cao, Valley News [White River Junction, VT], Dec. 11, 2016 (Year: 2016).*

(Continued)

*Primary Examiner* — Anne M Georgalas
(74) *Attorney, Agent, or Firm* — Alpine Patents LLC; Brian Van Osdol

(57) ABSTRACT

A system and method for a dynamic customer checkout experience within an automated shopping environment that includes generating a virtual cart for the customer through an automatic checkout system; tracking location of the customer; generating an assessment of the virtual cart; and selecting a processing mode for the customer based in part on the assessment and executing the processing mode within at least one computing device in coordination with the location of the entity.

23 Claims, 23 Drawing Sheets

(56) References Cited

U.S. PATENT DOCUMENTS

| | | |
|---|---|---|
| 7,274,803 B1 | 9/2007 | Sharma et al. |
| 7,283,650 B1 | 10/2007 | Sharma et al. |
| 7,319,779 B1 | 1/2008 | Mummareddy et al. |
| 7,505,621 B1 | 3/2009 | Agrawal et al. |
| 7,590,261 B1 | 9/2009 | Mariano et al. |
| 7,711,155 B1 | 5/2010 | Sharma et al. |
| 7,734,070 B1 | 6/2010 | Sharma et al. |
| 7,848,548 B1 | 12/2010 | Moon et al. |
| 7,911,482 B1 | 3/2011 | Mariano et al. |
| 7,912,246 B1 | 3/2011 | Moon et al. |
| 7,921,036 B1 | 4/2011 | Sharma et al. |
| 7,930,204 B1 | 4/2011 | Sharma et al. |
| 7,957,565 B1 | 6/2011 | Sharma et al. |
| 7,974,869 B1 | 7/2011 | Sharma et al. |
| 7,987,111 B1 | 7/2011 | Sharma et al. |
| 8,009,863 B1 | 8/2011 | Sharma et al. |
| 8,010,402 B1 | 8/2011 | Sharma et al. |
| 8,027,521 B1 | 9/2011 | Moon et al. |
| 8,098,888 B1 | 1/2012 | Mummareddy et al. |
| 8,189,926 B2 | 5/2012 | Sharma et al. |
| 8,219,438 B1 | 7/2012 | Moon et al. |
| 8,254,633 B1 | 8/2012 | Moon et al. |
| 8,295,597 B1 | 10/2012 | Sharma et al. |
| 8,325,982 B1 | 12/2012 | Moon et al. |
| 8,351,647 B2 | 1/2013 | Sharma et al. |
| 8,379,937 B1 | 2/2013 | Moon et al. |
| 8,380,558 B1 | 2/2013 | Sharma et al. |
| 8,396,758 B2* | 3/2013 | Paradise .............. G06Q 30/0609 705/26.62 |
| 8,412,656 B1 | 4/2013 | Baboo et al. |
| 8,433,612 B1 | 4/2013 | Sharma et al. |
| 8,448,859 B2* | 5/2013 | Goncalves .......... G06K 9/00771 235/383 |
| 8,520,906 B1 | 8/2013 | Moon et al. |
| 8,577,705 B1 | 11/2013 | Baboo et al. |
| 8,812,344 B1 | 8/2014 | Saurabh et al. |
| 9,120,621 B1 | 9/2015 | Curlander et al. |
| 9,141,931 B2 | 9/2015 | Ackerman |
| 9,161,084 B1 | 10/2015 | Sharma et al. |
| 9,250,712 B1 | 2/2016 | Todeschini |
| 9,262,681 B1 | 2/2016 | Mishra |
| 9,270,634 B1 | 2/2016 | Gu et al. |
| 9,317,785 B1 | 4/2016 | Moon et al. |
| 9,412,099 B1* | 8/2016 | Tyree .................... G06Q 20/208 |
| 9,426,720 B2 | 8/2016 | Cohn et al. |
| 9,474,934 B1 | 10/2016 | Krueger et al. |
| 9,740,977 B1 | 8/2017 | Moon et al. |
| 9,747,497 B1 | 8/2017 | Sharma et al. |
| 9,892,438 B1 | 2/2018 | Kundu et al. |
| 9,911,290 B1 | 3/2018 | Zalewski et al. |
| 9,948,902 B1 | 4/2018 | Trundle |
| 10,055,853 B1 | 8/2018 | Fisher et al. |
| 10,062,066 B2* | 8/2018 | Cancro ................ G06Q 20/3274 |
| 10,083,358 B1 | 9/2018 | Shin et al. |
| 10,127,438 B1 | 11/2018 | Fisher et al. |
| 10,133,933 B1 | 11/2018 | Fisher et al. |
| 10,134,004 B1 | 11/2018 | Liberato, Jr. et al. |
| 10,198,080 B1 | 2/2019 | Worley et al. |
| 10,198,625 B1 | 2/2019 | Shin et al. |
| 10,217,120 B1 | 2/2019 | Shin et al. |
| 10,262,331 B1 | 4/2019 | Sharma et al. |
| 10,296,936 B1 | 5/2019 | Saurabh et al. |
| 10,339,595 B2 | 7/2019 | Glaser et al. |
| 10,347,009 B1 | 7/2019 | Terven et al. |
| 10,354,262 B1 | 7/2019 | Hershey et al. |
| 10,380,814 B1* | 8/2019 | Mathiesen .............. G07C 9/253 |
| 10,387,896 B1 | 8/2019 | Hershey et al. |
| 10,474,858 B2 | 11/2019 | Davis et al. |
| 10,832,311 B2* | 11/2020 | Chomley .............. G06Q 20/14 |
| 2001/0010541 A1 | 8/2001 | Fernandez et al. |
| 2002/0122559 A1 | 9/2002 | Fay et al. |
| 2003/0210340 A1 | 11/2003 | Romanowich |
| 2003/0216969 A1 | 11/2003 | Bauer et al. |
| 2004/0201754 A1 | 10/2004 | McAlister |
| 2004/0260513 A1 | 12/2004 | Fitzpatrick et al. |
| 2005/0096997 A1* | 5/2005 | Jain ...................... G06Q 30/02 705/26.1 |
| 2005/0189411 A1 | 9/2005 | Ostrowski et al. |
| 2006/0032915 A1 | 2/2006 | Schwartz |
| 2006/0147087 A1 | 7/2006 | Goncalves et al. |
| 2007/0091177 A1 | 4/2007 | West et al. |
| 2007/0146873 A1 | 6/2007 | Ortyn et al. |
| 2007/0242300 A1 | 10/2007 | Inai |
| 2007/0284440 A1* | 12/2007 | Birmingham ........ G06Q 10/087 235/383 |
| 2008/0226129 A1 | 9/2008 | Kundu et al. |
| 2008/0228585 A1 | 9/2008 | Duri et al. |
| 2009/0195648 A1 | 8/2009 | Thomas et al. |
| 2010/0020173 A1 | 1/2010 | Marquart et al. |
| 2010/0255902 A1 | 10/2010 | Goldstein et al. |
| 2010/0280956 A1 | 11/2010 | Chutorash et al. |
| 2010/0295946 A1 | 11/2010 | Reed et al. |
| 2011/0122231 A1 | 5/2011 | Fujieda et al. |
| 2011/0215147 A1 | 9/2011 | Goncalves |
| 2012/0019168 A1 | 1/2012 | Noda et al. |
| 2012/0027297 A1 | 2/2012 | Feris et al. |
| 2012/0173351 A1 | 7/2012 | Hanson et al. |
| 2013/0103537 A1 | 4/2013 | Hewett |
| 2013/0147963 A1 | 6/2013 | Henninger et al. |
| 2013/0177201 A1 | 7/2013 | Fisher |
| 2013/0215116 A1* | 8/2013 | Siddique ............. G06Q 30/0643 345/420 |
| 2013/0223673 A1 | 8/2013 | Davis et al. |
| 2013/0262269 A1* | 10/2013 | O'Leary ................ G06Q 10/08 705/26.81 |
| 2013/0284806 A1* | 10/2013 | Margalit ................ G06Q 30/06 235/382 |
| 2013/0290557 A1 | 10/2013 | Baratz |
| 2013/0317300 A1 | 11/2013 | Berci et al. |
| 2013/0335571 A1 | 12/2013 | Libal |
| 2013/0342688 A1 | 12/2013 | Siu |
| 2014/0082519 A1 | 3/2014 | Wang et al. |
| 2014/0082610 A1 | 3/2014 | Wang et al. |
| 2014/0129688 A1 | 5/2014 | Asenjo et al. |
| 2014/0188601 A1* | 7/2014 | Buset ................ G06Q 30/0633 705/14.49 |
| 2014/0214564 A1* | 7/2014 | Argue ................ G06Q 30/0633 705/16 |
| 2014/0245160 A1 | 8/2014 | Bauer et al. |
| 2014/0263631 A1 | 9/2014 | Muniz |
| 2014/0265880 A1 | 9/2014 | Taipale et al. |
| 2014/0272855 A1 | 9/2014 | Maser et al. |
| 2014/0279191 A1 | 9/2014 | Agarwal et al. |
| 2014/0285660 A1 | 9/2014 | Jamtgaard et al. |
| 2014/0297487 A1 | 10/2014 | Bashkin |
| 2014/0330408 A1 | 11/2014 | Rolley |
| 2014/0363059 A1 | 12/2014 | Hurewitz |
| 2014/0365334 A1 | 12/2014 | Hurewitz |
| 2014/0372957 A1 | 12/2014 | Keane et al. |
| 2015/0012396 A1 | 1/2015 | Puerini et al. |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0046213 A1* | 2/2015 | Doreswamy ....... G06Q 30/0633 705/7.29 |
| 2015/0077787 A1 | 3/2015 | Nishimura et al. |
| 2015/0077797 A1 | 3/2015 | Kurokawa |
| 2015/0088694 A1 | 3/2015 | Ackerman |
| 2015/0095189 A1* | 4/2015 | Dharssi ................ G07G 1/0063 705/26.8 |
| 2015/0097961 A1 | 4/2015 | Ure et al. |
| 2015/0124973 A1 | 5/2015 | Arteaga et al. |
| 2015/0133190 A1 | 5/2015 | Fisher et al. |
| 2015/0138383 A1 | 5/2015 | Kelley et al. |
| 2015/0154973 A1 | 6/2015 | McKenna et al. |
| 2015/0156332 A1 | 6/2015 | Kandregula |
| 2015/0163412 A1 | 6/2015 | Holley et al. |
| 2015/0227890 A1 | 8/2015 | Bednarek et al. |
| 2015/0244992 A1 | 8/2015 | Buehler |
| 2015/0310601 A1 | 10/2015 | Rodriguez et al. |
| 2015/0327045 A1 | 11/2015 | Chang et al. |
| 2015/0373509 A1 | 12/2015 | Wang et al. |
| 2016/0012379 A1 | 1/2016 | Iwai |

(56) References Cited

U.S. PATENT DOCUMENTS

| | | |
|---|---|---|
| 2016/0019514 A1 | 1/2016 | Landers et al. |
| 2016/0027262 A1 | 1/2016 | Skotty et al. |
| 2016/0037135 A1 | 2/2016 | McSheffrey et al. |
| 2016/0100086 A1 | 4/2016 | Chien |
| 2016/0110791 A1 | 4/2016 | Herring et al. |
| 2016/0112608 A1 | 4/2016 | Elensi et al. |
| 2016/0132854 A1 | 5/2016 | Singh |
| 2016/0173827 A1 | 6/2016 | Dannan et al. |
| 2016/0217388 A1 | 7/2016 | Okanohara et al. |
| 2016/0224856 A1 | 8/2016 | Park et al. |
| 2016/0242252 A1 | 8/2016 | Lim et al. |
| 2016/0254864 A1 | 9/2016 | Mueller et al. |
| 2016/0270191 A1 | 9/2016 | Ludwig et al. |
| 2016/0282039 A1 | 9/2016 | Motukuri et al. |
| 2016/0289964 A1 | 10/2016 | Engberg |
| 2016/0321506 A1 | 11/2016 | Fridental et al. |
| 2016/0345414 A1 | 11/2016 | Nolan et al. |
| 2016/0358312 A1 | 12/2016 | Kolb et al. |
| 2017/0030766 A1 | 2/2017 | Hendrick |
| 2017/0032182 A1 | 2/2017 | Motukuri et al. |
| 2017/0039613 A1* | 2/2017 | Kaehler ............. G02B 27/0172 |
| 2017/0053171 A1 | 2/2017 | Buehler |
| 2017/0108236 A1 | 4/2017 | Guan et al. |
| 2017/0123030 A1 | 5/2017 | Hengerer et al. |
| 2017/0131781 A1 | 5/2017 | Buban |
| 2017/0161703 A1 | 6/2017 | Dodia |
| 2017/0169440 A1 | 6/2017 | Dey et al. |
| 2017/0178352 A1 | 6/2017 | Harmsen et al. |
| 2017/0188013 A1 | 6/2017 | Presler |
| 2017/0216667 A1 | 8/2017 | Garvey et al. |
| 2017/0249491 A1 | 8/2017 | MacIntosh et al. |
| 2017/0278175 A1 | 9/2017 | Park et al. |
| 2017/0316656 A1 | 11/2017 | Chaubard et al. |
| 2017/0323376 A1 | 11/2017 | Glaser et al. |
| 2017/0332956 A1 | 11/2017 | Bigolin et al. |
| 2018/0005044 A1 | 1/2018 | Olson |
| 2018/0012072 A1 | 1/2018 | Glaser et al. |
| 2018/0012080 A1 | 1/2018 | Glaser et al. |
| 2018/0088900 A1 | 3/2018 | Glaser et al. |
| 2018/0107968 A1 | 4/2018 | Wu et al. |
| 2018/0189763 A1 | 7/2018 | Olmstead et al. |
| 2018/0218562 A1 | 8/2018 | Conway |
| 2018/0232796 A1 | 8/2018 | Glaser et al. |
| 2018/0240180 A1 | 8/2018 | Glaser et al. |
| 2018/0245736 A1 | 8/2018 | Patel |
| 2018/0300553 A1 | 10/2018 | Khosla et al. |
| 2018/0322209 A1 | 11/2018 | Jin et al. |
| 2018/0332235 A1 | 11/2018 | Glaser |
| 2018/0332236 A1 | 11/2018 | Glaser et al. |
| 2018/0373928 A1 | 12/2018 | Glaser et al. |
| 2019/0005479 A1 | 1/2019 | Glaser et al. |
| 2019/0028643 A1 | 1/2019 | Oryoji |
| 2019/0043003 A1 | 2/2019 | Fisher et al. |
| 2019/0054347 A1 | 2/2019 | Saigh et al. |
| 2019/0079591 A1 | 3/2019 | Glaser et al. |
| 2019/0114488 A1 | 4/2019 | Glazer et al. |
| 2019/0116322 A1 | 4/2019 | Holzer et al. |
| 2019/0156273 A1 | 5/2019 | Fisher et al. |
| 2019/0156274 A1 | 5/2019 | Fisher et al. |
| 2019/0156275 A1 | 5/2019 | Fisher et al. |
| 2019/0156276 A1 | 5/2019 | Fisher et al. |
| 2019/0156277 A1 | 5/2019 | Fisher et al. |
| 2019/0156506 A1 | 5/2019 | Fisher et al. |
| 2019/0205933 A1 | 7/2019 | Glaser et al. |
| 2019/0244161 A1 | 8/2019 | Abhishek et al. |
| 2019/0333039 A1 | 10/2019 | Glaser et al. |
| 2020/0079412 A1 | 3/2020 | Ramanathan et al. |
| 2020/0134590 A1 | 4/2020 | Glaser et al. |
| 2020/0160670 A1* | 5/2020 | Zalewski ............. G06Q 20/327 |
| 2020/0279240 A1 | 9/2020 | Glaser et al. |

OTHER PUBLICATIONS

"Tracking Shopping Carts Using Mobile Cameras Viewing Ceiling-Mounted Retro-Reflective Bar Codes," by Thomas G. Zimmerman, Proceedings of the Fourth IEEE International Conference on Computer Vision Systems (ICVS 2006) (Year: 2006).*

U.S. Appl. No. 16/218,310, filed Dec. 12, 2018, William Glaser.

U.S. Appl. No. 16/911,311, filed Jun. 24, 2020, William Glaser.

U.S. Appl. No. 17/083,136, filed Oct. 28, 2020, William Glaser.

Elizabeth Weise: "How Amazon's line-less grocery services might really work", Usatoday, Dec. 8, 2016 (Dec. 8, 2016), Retrieved from the Internet: URL: https://eu.usatoday.com/story/tech/news/2016/12/06/amazon-go-surveillance-cameras-shopping-grocery-supermarket/95055200/ [retrieved on Feb. 21, 2020] *the whole document*.

* cited by examiner

US 11,132,737 B2

DYNAMIC CUSTOMER CHECKOUT EXPERIENCE WITHIN AN AUTOMATED SHOPPING ENVIRONMENT

CROSS-REFERENCE TO RELATED APPLICATIONS

This Application claims the benefit of U.S. Provisional Application No. 62/457,656, filed on 10 Feb. 2017 and U.S. Patent Application No. 62/523,183, filed on 21 Jun. 2017, both of which are incorporated in their entireties by this reference.

TECHNICAL FIELD

This invention relates generally to the field of checkout processing, and more specifically to a new and useful system and method for a dynamic customer checkout experience within an automated shopping environment.

BACKGROUND

The checkout experience can vary greatly depending on the volume of customers in line, the items purchased by those customers, the number and experience of workers, and/or other factors. In some stores, self-checkout kiosks allow customers to scan items manually and checkout. However, lines will often form for self-checkout kiosks and the process can be cumbersome and confusing. For self-checkout stations and worker staffed checkout stations process, the process can be slow, error prone, and a source of frustration. In a time when customers have many options for online and delivery options, a poor customer experience can result in a loss of sales for physical stores. Some basic automatic self-checkout experiences have had early stages of exploration but are mostly applied in controlled environments. Such experiences, in many cases, do not accommodate implementation within large environments or in environments alongside traditional checkout experiences thus limiting their applicability. Thus, there is a need in the checkout processing field to create a new and useful system and method for a dynamic customer checkout experience within an automated shopping environment. This invention provides such a new and useful system and method.

DESCRIPTION OF THE EMBODIMENTS

The following description of the embodiments of the invention is not intended to limit the invention to these embodiments but rather to enable a person skilled in the art to make and use this invention.

1. Overview

A system and method for dynamic customer checkout experience within an automated shopping environment of preferred embodiments function to facilitate the checkout process in a store or other suitable environment. The system and method are preferably used in connection with a store that offers an automated checkout option.

Figure 1:
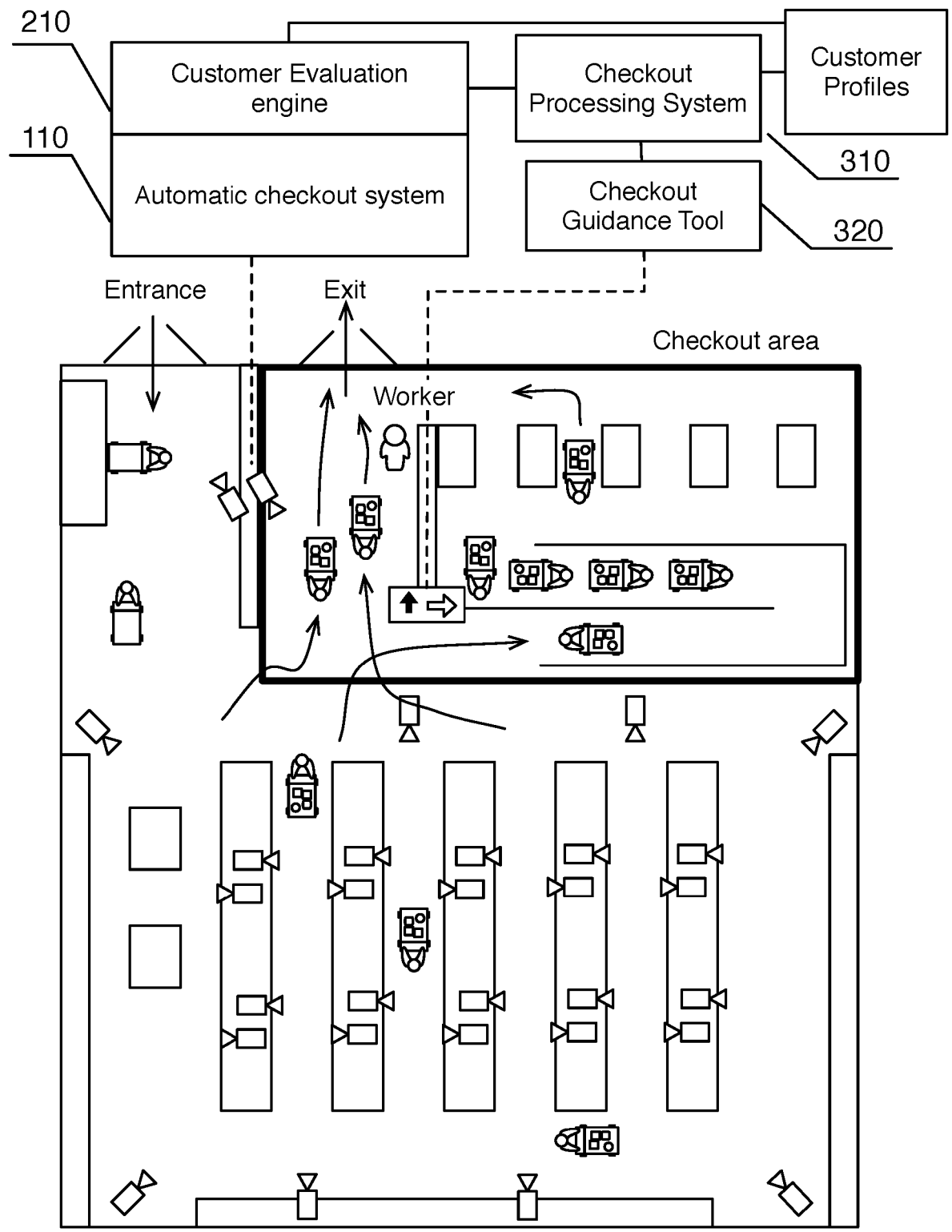
FIG. 1 is a schematic representation of a system of a preferred embodiment implemented within an exemplary shopping environment.

The system and method can be applied to dynamically directing customers, updating the checkout processing mode of a point of sale (POS) device, directing workers, and/or augmenting other aspects of a customer's and/or worker's interactions within an automated shopping environment as shown in FIG. 1.

The system and method are preferably used in combination with a system or method for automatic checkout, which is preferably a computer vision based automatic checkout system and method but the automatic checkout approach may alternatively or additionally utilize RFID tags, item-monitoring dispensers or shelves, scales, various forms of sensor fusion, smart carts, shopper facilitated item scanning, and/or any suitable technique for automatic checkout. Accordingly, the system and method described herein may be applicable to a wide variety of checkout tools and techniques.

Herein, automatic checkout is primarily characterized by a system or method that generates or maintains a virtual cart (i.e., a checkout list) during the shopping process with the objective of knowing the possessed or selected items for billing. The checkout process can occur when a customer is in the process of leaving a store. The checkout process could alternatively occur when any suitable condition for completing a checkout process is satisfied such as when a customer selects a checkout option within an application. In performing an automatic checkout process, the system and method can automatically charge an account of a customer for the total of a shopping cart and/or alternatively automatically present the total transaction for customer completion. Actual execution of a transaction may occur during or after the checkout process in the store. For example, a credit card may be billed after the customer leaves the store.

The system and method can have applications in a wide variety of environments. In one variation, the automatic checkout processing of the system and method can be used within an open environment such as a shopping area or sales floor where customers interact with inventory and purchasable goods. A customer may interact with inventory in a variety of manners, which may involve product inspection, product displacement, adding items to carts or bags, and/or other interactions. The system and method can be used within a store environment such as a grocery store, convenience stores, micro-commerce & unstaffed stores, bulk-item stores, super stores, retail stores, big box store, electronics store, bookstore, convenience store, drugstore, pharmacy, warehouses, malls, markets, shoe store, clothing store, and/or any suitable type of shopping environment.

Figure 2:
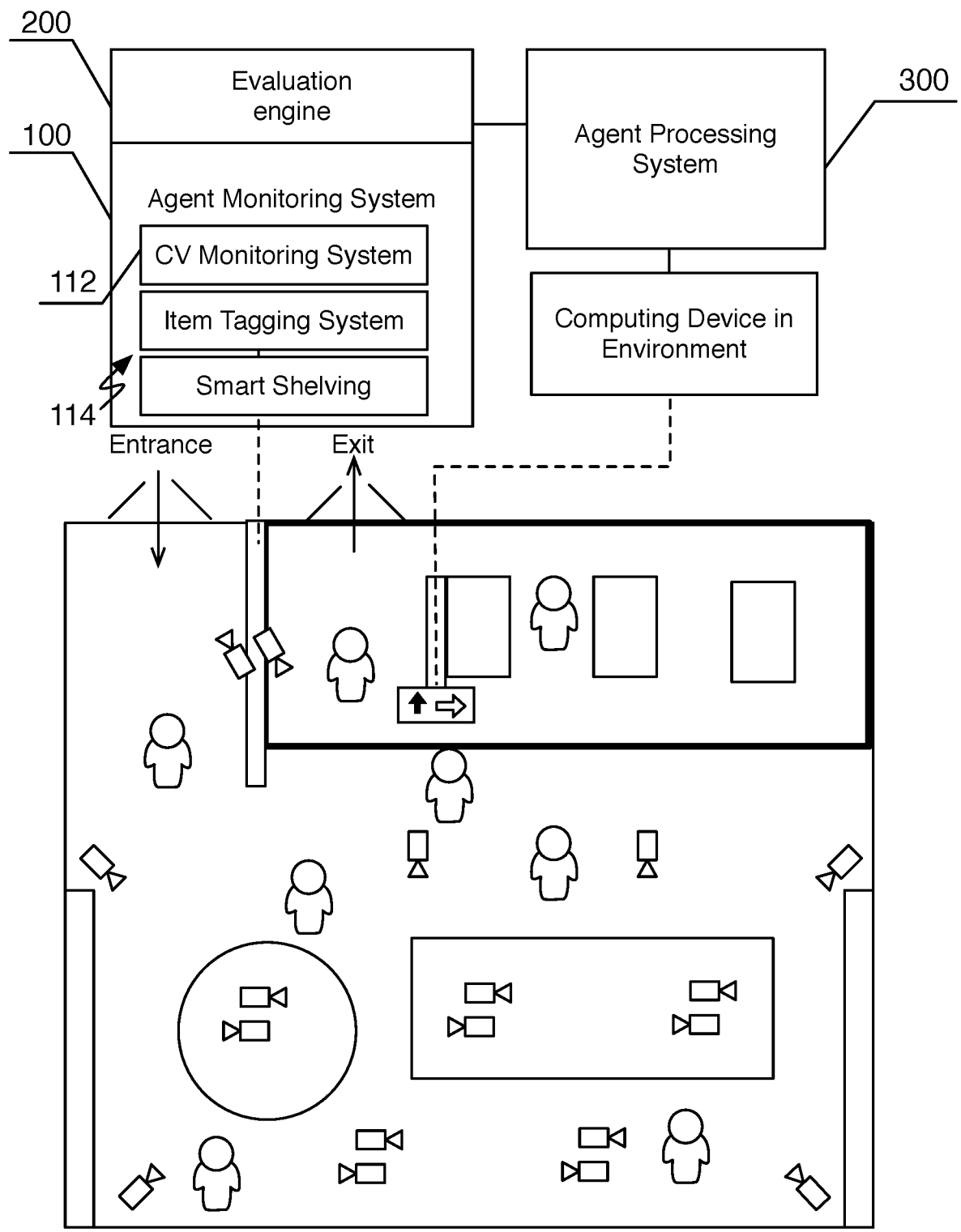
FIG. 2 is a schematic representation of a system of a preferred embodiment.

The system and method may alternatively be applied to other forms of modeling user interactions within an environment as shown in FIG. 2. Such systems and method may use automatic checkout processing but may alternatively have other transactions or events (e.g., permitting access, performing a security check, renting objects, etc.) controlled in place of a checkout process. In one variation, the system and method may be used to account for the removal of a good by a customer such as in a library, a rental store, a warehouse, or any suitable item storage facility. In place of a monetary transaction, the item is credited to a user's account within a rental checkout process. In another variation, the system and method may be used to permit or restrict access to locations, or to charge for such access. Herein, the system and method are primarily described as being used to selectively augment the checkout process for a customer, but the system and method could similarly be applied to other types of interactions or events that occur within an environment and are based on user properties, past interactions of the user, and/or other aspects.

Generally, the system and method judge or analyze the monitored interactions of agents (e.g., humans) within the environment. In particular, the system and method are preferably used in judging or analyzing the state of a virtual cart of a customer that was generated by an automatic checkout system and then guiding an appropriate response such as by permitting the customer to leave with seamless billing or by directing the customer to a traditional checkout station. Said virtual cart could be the logical analog of a physical cart, basket, or bag; or merely the list of items help in the possession of a person without an explicit container. Additionally, the system and method may function to resolve issues relating to the checkout process of a customer such as addressing and correcting potential errors in a virtual cart.

Within a shopping environment, the system and method are preferably used in enhancing the shopping experience and in particular enhancing the checkout process. This is preferably performed in connection with addressing automatic checkout. In some implementations, this could be used to ensure eligible customers can have a seamless automatic checkout experience. In some implementations, this can be used in accelerating the checkout process in existing checkout stations. For example, the virtual cart of a customer could be automatically synchronized to a worker stationed checkout station so that the worker can facilitate collection of payment and assist in other ways.

The system and method could alternatively be used in situations where automatic checkout is not an option. For example, the system and method in some variations could be used in directing customers to appropriate checkout lanes based on the modeled items (e.g., modeling an estimate of number of items) selected for purchase and the modeling of customers in the various checkout lanes so as to improve checkout efficiency.

The system and method may be implemented or embodied in a variety of ways. In one implementation, the system and method is a set of different environmental devices working in coordination to facilitate directing customers, dynamically executing checkout processes that appropriately leverage virtual cart data, assist workers in management of the checkout process, and/or other tasks. The system and method may alternatively be applied in more limited and targeted ways.

In one variation, the system and method is used to augment a checkout station (e.g., a point of sale/POS system) operated by a worker or a customer such that the checkout station can dynamically use virtual cart data as the virtual cart data is available.

In another variation, the system and method can be used in entry or exit gates or devices used to assist customers using automatic checkout features. In a similar variation, the system and method can be used in implementing smart customer-directing infrastructure that can communicate to a customers how to checkout.

In another variation, the system and method can be used in implementing a worker application that is used by a worker in monitoring customers, assisting in the checkout process, and performing other duties within the environment.

In another variation, the system and method can be used in implementing a customer application that enables customer-facilitated checkout within an application on a customer-controlled device.

As one potential benefit, the system and method can facilitate handling the processing of a diverse population of customers or, more generally, agents within an environment. Accordingly, the system and method may improve user experience for customers in a mixed environment where a portion of the customers are taking advantage of an automatic checkout option while another portion use a more traditional checkout process. Accordingly, the system and method can enable automatic checkout processing alongside other checkout processing options and capabilities. In a shopping environment, the system and method may manage serving a diverse population of customers that may include traditional checkout customers, automatic checkout customers, loyal customers, first time customers and/or other types of customers. Customers can be selectively handled in the mode appropriate for them based on their shopping behavior (e.g., opting in or out of automatic checkout), the state of agent modeling during their visit (e.g., degree of confidence in the modeled virtual cart), and/or other factors. T system and method may work to address problems and confusion that may occur when a store attempts to support traditional checkout processes alongside automatic checkout processes. This additionally enables automatic checkout to be distributed in more environments where the shopping environment cannot afford to have an abrupt transition from traditional checkout processing to automatic checkout processing.

As a related potential benefit, the system and method may facilitate sorting or triaging customers based on various conditions. At a basic level, the system and method can be used to facilitate sorting customers between an automatic checkout process and a facilitated checkout process. Various conditions that may be used in sorting customers can include the state of a customer's enrollment in the automatic checkout system, the virtual cart item list, the virtual cart total, confidence level in the contents of a virtual cart, prediction issues with one or more items in the virtual cart, customer purchase history (e.g., loyal customer or new customer, purchase trends, etc.), cost-benefit analysis considering financial and other factors, and/or other suitable inputs.

As another potential benefit, the system and method enable a set of new tools and devices that support environments enabled for automatic checkout as well as augmenting existing infrastructure with new features for compatibility within such an environment. A wide variety of guidance tools for workers, customers, and/or the store environment are described herein. Guidance tools of the system and method can be applied to automatic checkout, augmented checkouts, and/or regular checkout experiences.

As a related potential benefit, the system and method can be applied to provide more transparent automatic checkout. In some implementations automatic checkout may include or be used in combination with check-in or checkout stations, kiosks, gates, and/or other suitable interaction points. However, in other implementations, the system and method could be used to provide less obstructive and restrictive interactions for customers. In one example, a shopping environment could have an open checkout region where customers are free from having to pass through a turnstile or checkout station unless if, for example, the customer wants to review some aspect of their checkout experience.

As another potential benefit, the system and method may streamline the resolution of issues with a virtual cart. Automatic checkout systems will likely be imperfect and their use may be accompanied with a wide variety of problems or warning states. The system and method can preferably minimize the negative impacts of such problems from a store and customer perspective by selectively addressing issues.

As another potential benefit, the system and method may be used to enroll an automatic checkout system in a new shopping environment. The system and method can gradually transition the roll out of automatic checkout features while still operating with existing checkout systems. The balance between automatic checkout processing and traditional checkout could even be dynamically managed. Thus a store may be able to direct the volume, rate, number, or other limits around automatic checkout. This could be used to adjust checkout processing based on the time of day, number of workers, number of customers, and/or other conditions (e.g., large sales like holiday sales and the like). On a more granular level, new items introduced in the store could be directed through non-automatic checkout processing while the system and method on board that item for better modeling and tracking in virtual carts. As another variation, how automatic checkout is supported could be incrementally altered. For example, automatic checkout may additionally be supported by automatically entering items of a virtual cart in a checkout station, then automatic checkout eligible customers could be directed to self-checkout stations or automatic checkout stations, and then automatic checkout eligible customers could begin to be directed to exit through an automatic checkout region.

In some variations, the system and method may additionally provide another potential benefit of enhancing manual checkout stations. Manual checkout stations and/or worker-staffed checkout stations may have virtual cart information synchronized to that station in coordination with the presence of a customer. In this way, a customer and/or a worker could be alleviated from entering all or a portion of items.

As yet another potential benefit, the system and method can provide an easy onboarding process for a customer new to automatic checkout. A customer unfamiliar or uncomfortable with automatic checkout could observe the ease of use and efficiency of automatic checkout through the system and methods enhancement of a traditional checkout station. Such checkout stations could additionally support enrollment of an account, synchronization with a user application, and/or provide other information that may guide a customer to trying more automatic checkout features in subsequent visits.

The system and method can additionally have benefits related to enhancing the checkout process' resilience to theft, shrinkage, checkout errors, and/or other problems that can cost stores and customers.

The system and method is preferably used in combination with an agent monitoring system and more specifically an automatic checkout system that uses a CV-based monitoring system to model agents (e.g., customers) within an environment. The agent monitoring system may use alternative monitoring systems or use supplementary monitoring systems 114 such as RFID tags and readers and/or smart shelving. However, herein the description primarily discusses the system and method as implemented in connection with a CV-based monitoring system. A CV monitoring system will generally include modeling of interactions of an agent (e.g., customer selecting and deselecting items for purchase through a store) and associating such interactions with a record and/or account. In discussing such a concepts, the system and method may describe the involved elements using the terminology of CV-person, user-record, user-account, agent, human, user, customer, worker, device instance, associations, environment, checkout region, and virtual cart which are generally characterized below. One skilled in the art would appreciate that use of such terms are not intended to limit the system and method to the implementations using such modeling constructs and could include any suitable modeling approach using a different sensing approach and/or model architecture.

A CV-person as used herein characterizes a detected and optionally tracked physical person represented by a CV system. A CV-person may, or may not, have any personally identifying information or person-associated metadata. The CV-person will generally represent the presence of a person in an environment and optionally the location, actions, activity, CV-derived properties, and/or other information based on image processing. Here a CV monitoring system characterizes an imaging system and/or processing system employing computer vision to facilitate the detection and tracking of objects, detecting actions, and performing other CV-based operations. Description of a CV-person could alternatively be a CV-agent that more generally can include CV detected and tracked objects such as carts, bags, baskets, or other suitable objects. A CV monitoring system could additionally detect and track CV-items, CV-products, and/or other elements. Herein, the system and method primarily describe CV modeling as it applies to a human (e.g., customer) but could similarly be applied to other suitable CV detected objects.

A user-record as used herein characterizes a computer record that is associated with a single human or being. A user-record can preferably be associated with a CV-person to uniquely identify, track, and record state of the CV-person. A user-record will preferably include various properties. Properties of a user-record may include personal identifiable information, but it may alternatively not include any identifiable information. A user-record in some implementations may also include payment information, user settings, user history, privilege settings/permissions, and/or other information. Properties of a user-record may initially use default settings that are used as placeholders until these properties can be updated.

A user-record can be an internal model of a human. As an internal model of a human, the user-record could be an ephemeral user-record that is preserved for essentially the duration that the CV-person is detected in the environment. For example, a user-record can be created and updated for the duration that a customer is present in a store. As an internal model of a human, a user may not explicitly create or have direct access to manage the user-record in some implementations. In one variation, the user-record can be, include, or reference a user-account, where at least part of the user-record may be user managed.

A user-account as used herein characterizes an account in the system that can be accessed and manipulated by a user. A user-account will generally be accompanied with some authorization process such as a username and password to enable user management of some aspects of the user-account. The user-account may reference a user-account of an outside system such as a social media platform. In the exemplary use case of the system applied to automatic checkout, a user-account may be used to enable a user to register an application instance, edit payment methods, change account settings, view shopping history, edit shopping lists, and/or perform other actions. These actions can be synchronized with the user-account and can be performed outside of a CV monitoring system, but can preferably be leveraged by a CV monitoring system when the system and method associates a CV-person and a user-account.

An agent as used herein characterizes a detected and/or tracked object or entity that may be a subject of interactions within the environment. An agent is preferably uniquely detected and tracked within an environment, and the system and method preferably support simultaneous detection, tracking, and modeling of agent interactions within an environment. An agent is preferably a human but could alternatively be a shopping cart, a basket, a bag, a box or container, an automated device like a robot or vehicle, and/or any suitable entity.

A human as used herein characterizes a human being with a unique identity sometimes referred to as a user. In the exemplary use case of the system and method applied to automatic checkout, a human user can be a customer, a worker, or an otherwise present person in the environment that may or may not have a clearly defined role. A human could similarly generalize to other living or non-living agents or entities such as farm animals, pets, vehicles, robots, and the like. Herein, we will primarily reference humans according to their exemplary role as customers or workers but one knowledgeable in the art would appreciate that the system and method are not limited to use with humans or any particular role.

A device instance as used herein characterizes a unique instantiation of a stateful device present in the environment. A device instance in many cases is a computing device such as smart phone, a wearable computer, a tablet, a personal computer, or a computing kiosk/station. A device instance is preferably uniquely identifiable. In some cases, the device instance is more specifically an application instance on a device such as an application installed by a user. Continuing with the use case of the system applied to automatic checkout, the application instance can be an application of the automatic checkout service that a customer can use to view their currently selected items, complete checkout, and modify settings. The application instance could alternatively be an application of a worker. In some instances, the system and method can facilitate synchronizing the state of the application instance with a user-record or, if a user logs into an account, a user-account. For example, the state of a virtual cart and/or the enabled checkout processing mode for a customer could synchronized with a customer user application. In another example, the state of virtual carts and/or checkout processing modes for multiple customers could be communicated and presented to a worker through a worker application.

Figure 3:
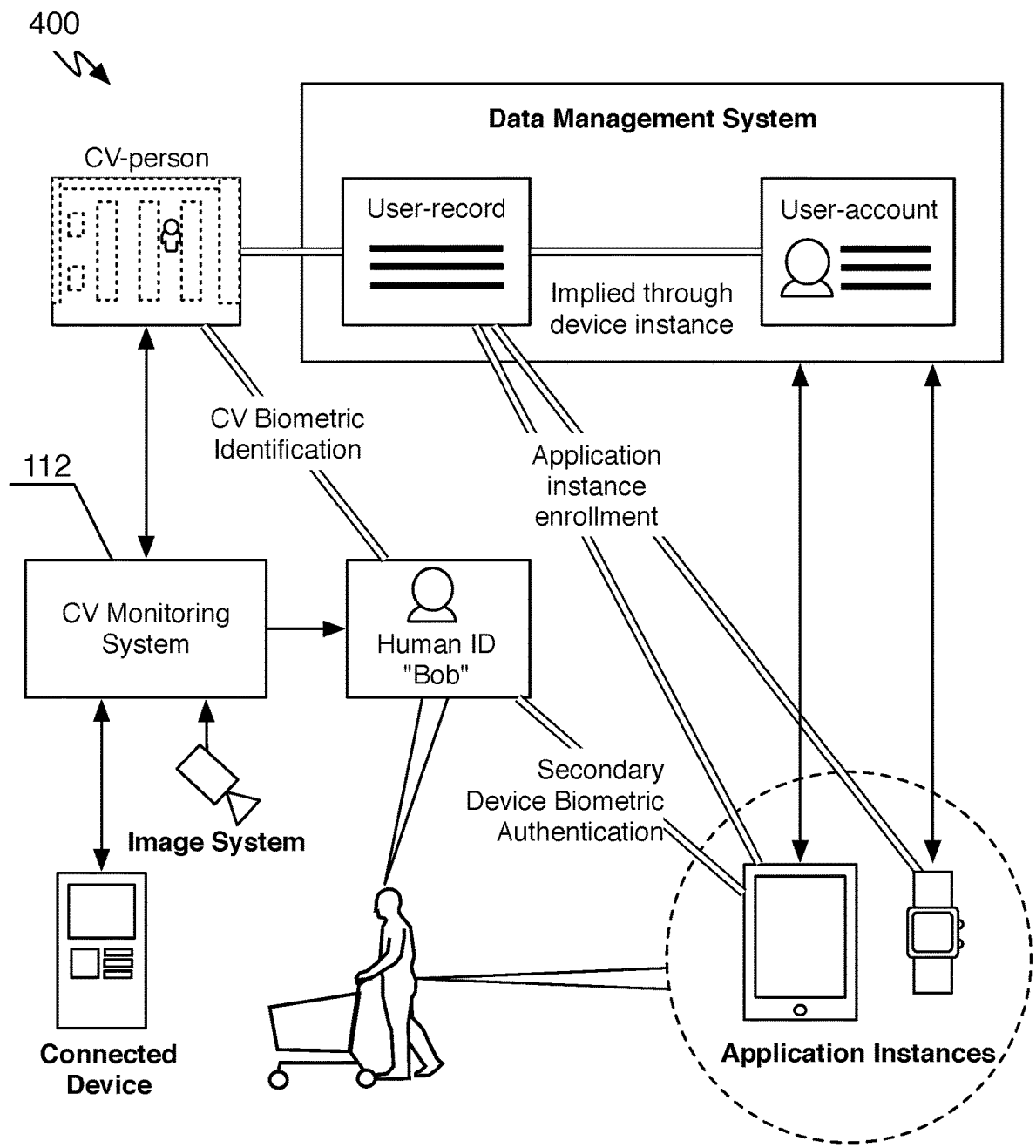
FIG. 3 is a schematic representation of a synchronization engine of a preferred embodiment.

An association as used herein is a variation of symbolic linking or data referencing of at least two data-modeled association elements selected from the set of a CV-person, a user-record, user-account, a device instance, a human/agent, and/or other suitable association element as shown in FIG. 3. Association elements may be machine readable data, data references, devices, and/or device references. In the case of establishing or synchronizing a customer with the system and method, an association is preferably a three-element association of a CV-person and a user-record with at least one of a user-account, a device instance, and or a human. In some instances an association for a customer may be of a CV-person and a user-record such that a interactions and modeling in the user-record can be associated with location and modeling from a CV monitoring system. An association can be stashed by a synchronization engine.

Figure 4:
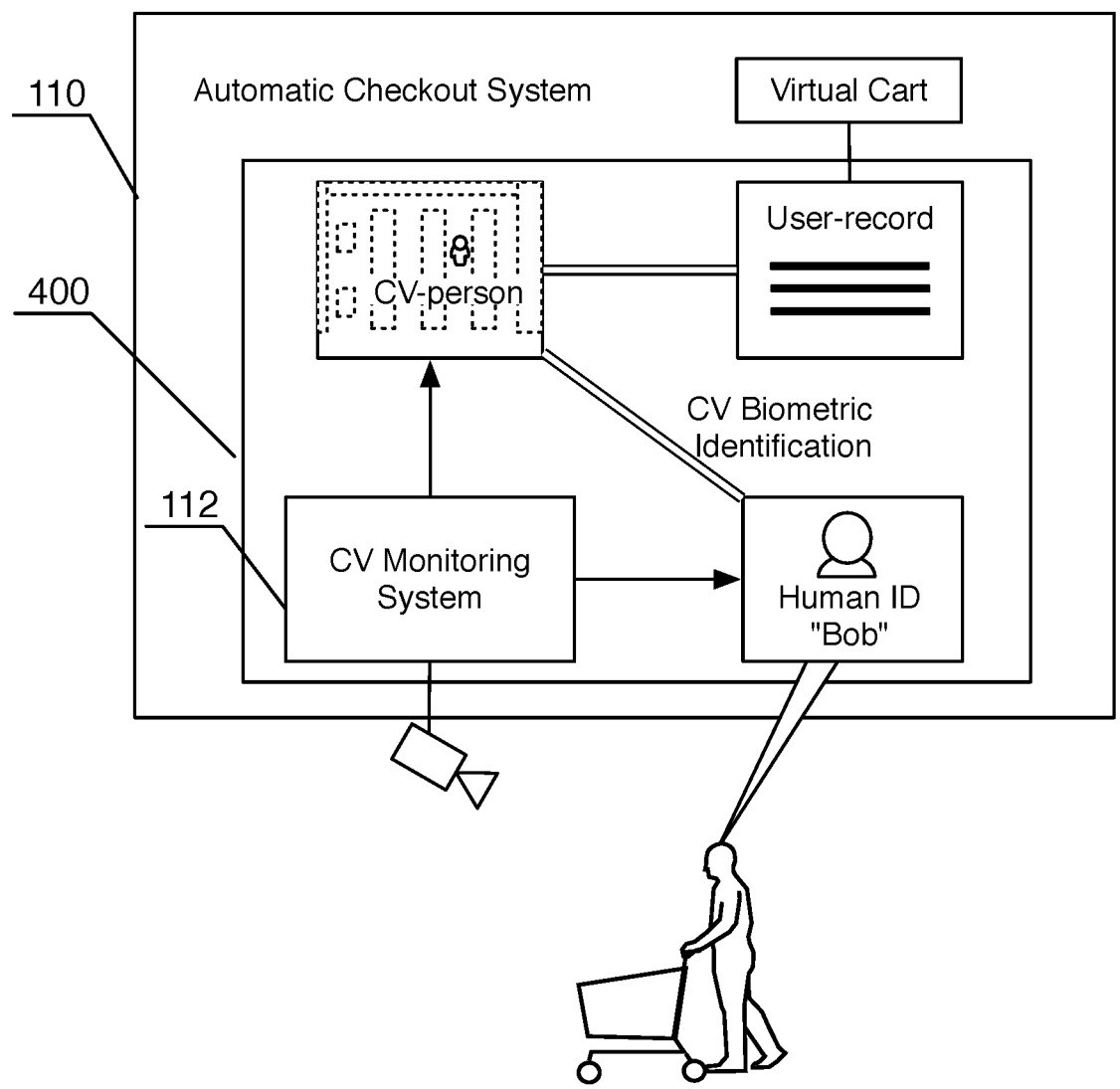
FIGS. 4-6 are schematic representations of variations of associations established by a synchronization engine.

An association that includes a human association as shown in FIG. 4 can provide positive confirmation of that human. An association with a human can be through biometric detection of the human through the CV system. A human association could also be indirectly established through biometric identification through a device/application.

Figure 5:
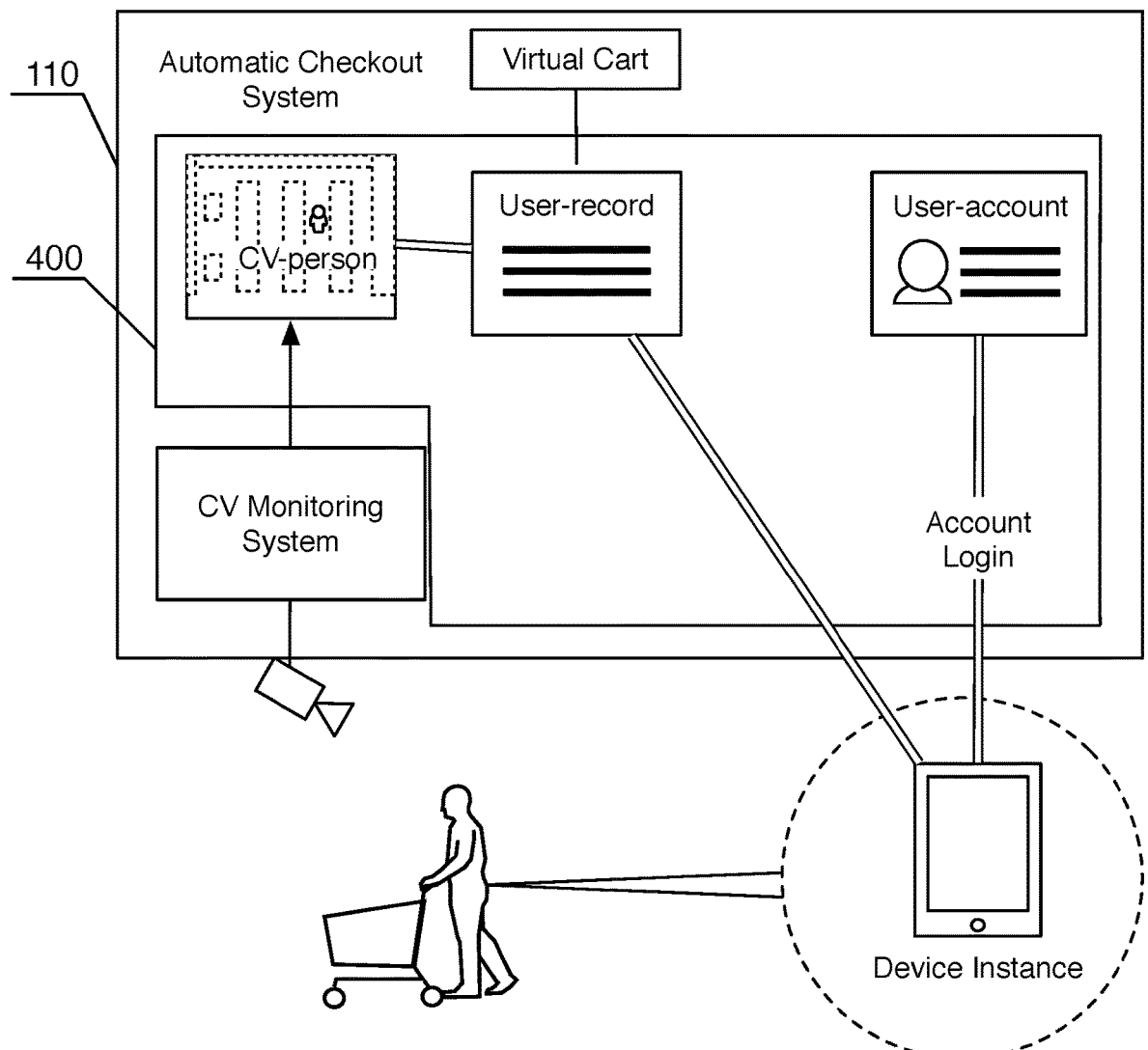

An association that includes a device instance association as shown in FIG. 5 can establish state synchronization with the device and/or application. Interactions with an app can influence the CV system and similarly detected information from the CV system can be pushed to the device or application instance. The system and method may use such associations to coordinate updating an appropriate instance of a checkout station with virtual cart data upon detecting the approach of an associated CV-person.

Figure 6:
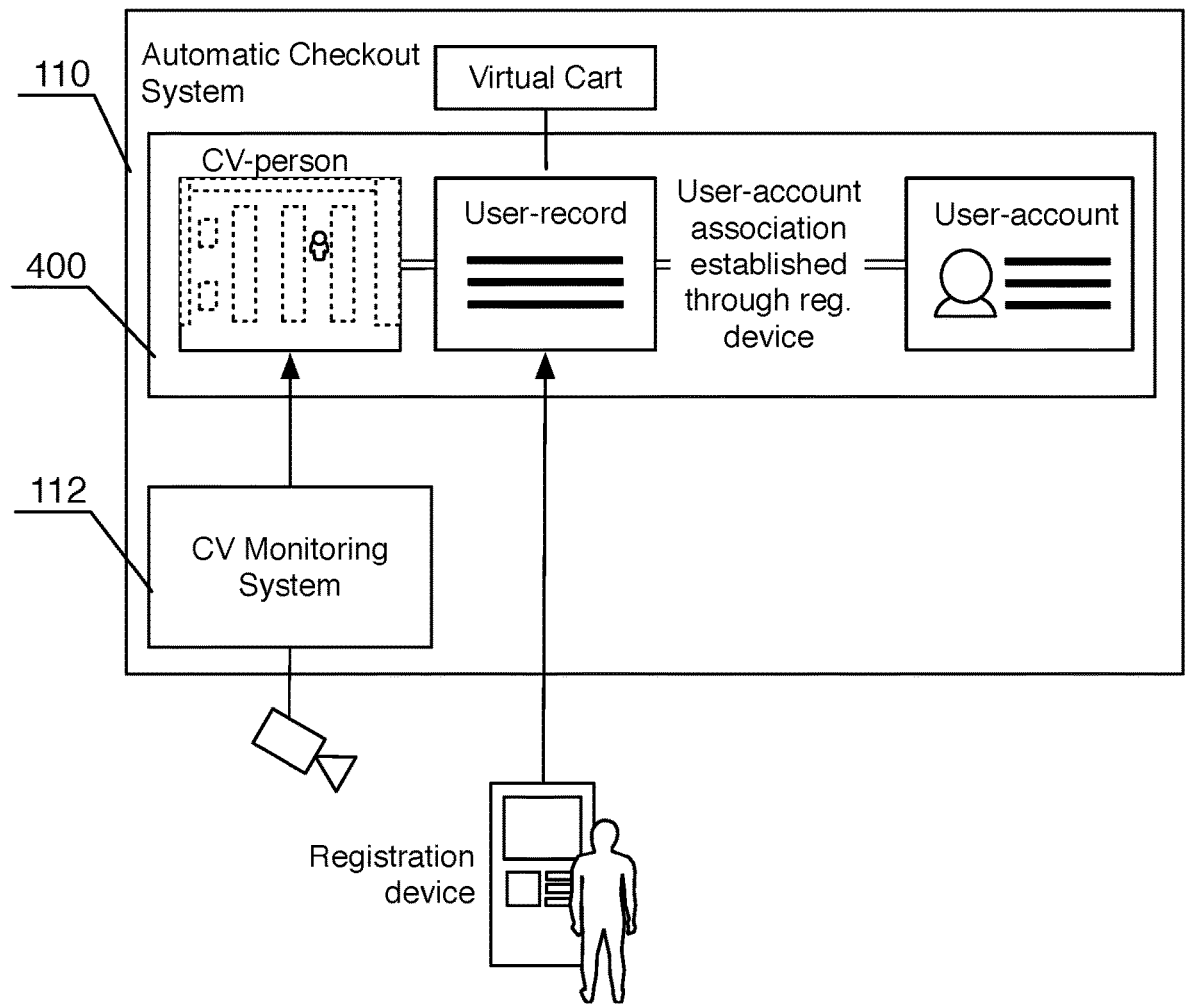

An association that includes a user-account as shown in FIG. 6 can establish state synchronization with the user-account to leverage stored user associated data and settings. Stored settings of an account can influence the CV system, and, similarly, detected information from the CV system can be used to update the user-account. In one example, payment information can be stored in association to a user-account and used to automatically pay for a checkout list of a checkout process.

An association is preferably maintained for the duration of the CV-person (e.g., duration of a shopper shopping in a store). The association may additionally be maintained across multiple visits to multiple stores—the association will generally be reestablished for each visit. The system and method can facilitate the establishment and/or reestablishment of the association. An association can additionally be expanded to include other association elements. Elements of an association could however undergo permanent disassociation (e.g., removing a device instance) or temporary disassociation (e.g., disassociating a user-account for anonymous shopping during a single visit).

An environment as used herein characterizes the site where an agent monitoring system is installed and operational. The system and method can be made to work for a wide variety of environments. In a preferred implementation, the environment is a shopping environment such as a grocery store, convenience store, micro-commerce & unstaffed store, bulk-item store, pharmacy, bookstore, warehouse, mall, market, and/or any suitable environment that promotes commerce or exchange of goods or services. An environment is generally the inside of a building but may additionally or alternatively include outdoor space and/or multiple locations. In alternate use cases, the environment can include a household, an office setting, a school, an airport, a public/city space, and/or any suitable location. The environment can be a locally contained environment but may alternatively be a distributed system with wide coverage.

A checkout region as used herein characterizes a region or location within the environment wherein selective processing may occur. An environment will generally include an interaction region and checkout region, where an interaction region can characterize the space in the environment where a virtual cart may be generated. The checkout region and the interaction region may be distinct. For example, items selectable for purchase may not be present in the checkout region. More preferably, the checkout region is a subset or at least overlaps with a portion of an interaction region such that modeling of a customer can continue while in the checkout region. The checkout region may be located along exits of an environment but could be in any suitable location. In some locations, the notion of a checkout region may not apply as a checkout process could be triggered in any suitable location in any suitable time.

A virtual cart is characterized as a record of items selected by or for a customer. The virtual cart is preferably a substantially real-time record, but may alternatively be updated at least in part asynchronous to interactions of a customer (e.g., placing of item in a cart). The items in the virtual cart are preferably used in setting a purchase total for a financial transaction during a checkout process. A virtual cart can be associated with a user-record, which may then be associated with a user-account, device instance or other associative element. The items may alternatively be credited to a user-account during the checkout process for alternative use cases such as an item rental use case. In the case that a payment mechanism is not linked to a user-record of a virtual cart, then a virtual cart may be communicated to a checkout processing station to receive payment from the customer.

2. System

As shown in FIG. 2, a system for dynamic customer checkout experience within an automated shopping environment of a preferred embodiment can include an agent monitoring system 100, an evaluation engine 200, and an agent processing system 300. The system is preferably used in dynamically selecting a processing mode of the agent processing system 300 in coordination with the modeling of the agent by the agent modeling system 100 and an assessment generated by the evaluation engine 200.

As described, the system is preferably used within a system that functions to facilitate automatic checkout processing within a shopping environment. The system is preferably used in dynamically directing automatic checkout processing within a shopping environment. The system may alternatively be used in dynamically directing other interactions such as item rental, space usage, wait lines or queues, ticketing processes, security checks, restaurants, cafeterias, bars, and/or other applications. The system can be particularly useful when the individual processing of a multiple agents is performed.

In an automatic checkout related variation, the system preferably includes an automatic checkout system 110, a customer evaluation engine 210, and a checkout processing system 310 applied in a checkout region as shown in FIG. 1. The checkout processing system 310 may include one or more checkout guidance tools 320 or other augmented checkout processing related devices. The automatic checkout system 110 is preferably used in generating a virtual cart for a customer, and the virtual cart is at least partially used by the customer evaluation engine 210 in determining an appropriate approach to handling the checkout process of the customer. One or more checkout guidance tools 320 may then be directed by the customer evaluation engine to guide the checkout process and/or resolve any issues with a virtual cart.

In an automatic checkout variation, the system may include configuration to dynamically select the processing mode for an entity and execute the processing mode through an electronic computing device. The selection of a checkout processing mode can in part be based on an assessment of the virtual cart, customer properties, store settings or conditions, and/or other factors considered by an evaluation engine 200. Furthermore, the system can include configuration to coordinate the selection and execution of a checkout processing mode with the location of the customer. For example, a checkout process may be appropriately triggered as a customer approaches a checkout region.

Agent Monitoring System

The agent monitoring system 100 functions to detect, track, classify, and/or otherwise model state and interactions of an agent and other objects in an environment. The agent monitoring system 100 preferably includes a computer vision monitoring system 112 that uses image and/or video interpretation. The agent monitoring system 100 may additionally or alternatively use other sensing and/or monitoring systems. Some exemplary types of sensing and/or monitoring systems could include a wireless tagging system, a smart shelving system, a smart cart system, a sensor fusion system, user application (e.g., for customer assisted entry in the shopping region), human-in-the-loop processing, and/or an item entry system.

Some implementations of the system may include an agent monitoring system 100, part of an agent monitoring system 100, and/or interface or operate on an output of an agent monitoring system 100. For example, the system may operate independently of the system generating the virtual cart or other monitoring data, but can receive or retrieve such data to augment checkout processing.

Preferably, the agent monitoring system 100 is an automatic checkout system 110, which functions to generate a virtual cart while a customer is shopping in the environment. The agent monitoring system 100 may alternatively model other interactions. In one variation, the agent monitoring system 100 can track an estimate of selected items (e.g., a number of items selected, categories of items), shopping behavior (e.g., duration of visit, frequency of store visits, areas visited within the environment), and/or other aspects. Herein, the system is primarily described as it relates to the generation of a virtual cart, assessment of the virtual cart, execution of checkout process, and/or activation of a checkout guidance tool. The execution of a checkout process and/or activation of the checkout guidance tool 320 may be based in part on the virtual cart, but an agent monitoring system 100 with other modeling capabilities and objectives could similarly be applied.

Figure 7:
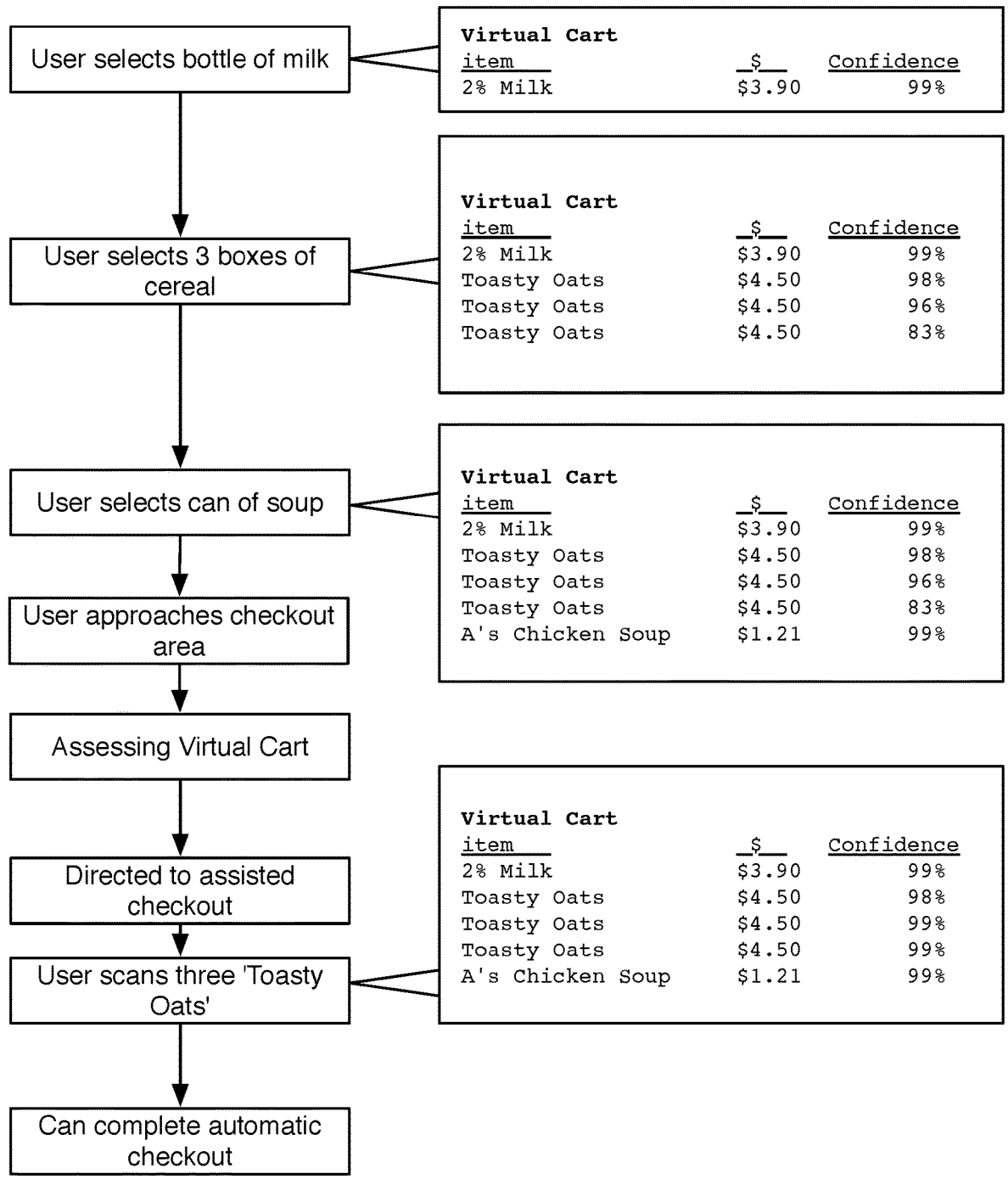
FIG. 7 is a graphical flowchart representation of exemplary events for a user using the automatic checkout process.

Through an automatic checkout system 110, a customer may be enabled enter a store, select items they wish to buy, have the automatic checkout system 110 detect the selected items, and then leave the store using a streamlined checkout process for the selected items as shown in FIG. 7. In other variations, a virtual cart may be used to augment checkout stations.

A virtual cart is preferably a data record or records that include an item list making up an intended checkout list. The virtual cart may additionally include a confidence score (or contrarily an uncertainty score) for each item. The confidence score is preferably based on the confidence of the sensing/modeling of the automatic checkout system 110. The virtual cart may additionally or alternatively include a confidence score for the overall virtual cart. Items are preferably added to the virtual cart when the automatic checkout system 110 detects that an item should be added for a customer. Customer selection of an item from a shelf or storage can result in adding the item to a virtual cart, and customer returning of an item to a shelf, storage, or otherwise removed from the customer's immediate control can result in removing the item from the virtual cart.

The automatic checkout system 110 can maintain multiple different virtual carts for different customers. The virtual cart preferably initializes as an empty virtual cart when a customer enters the shopping environment. In the situations where there is uncertainty of a selected or potentially selected item, a set of possible item candidates may be included in the item list. Each item candidate may have a probability and/or confidence score. Item records stored or referenced by a virtual cart may include the item price, item history (with the particular customer or across a set of customers), and/or item conditions. An item condition may be used to flag items for age verification such as alcohol or other customer item handling tasks.

The automatic checkout system 110 may support various rules or manners of user behavior used in shopping. For example, the automatic checkout system 110 may detect physically holding selected items (e.g., in a customer's hand or in a pocket), storing selected items in a carried bag or basket, placing items in a shopping cart, and/or other ways of characterizing when an item is selected for purchase.

As discussed, an agent monitoring system 100 could be used with a variety of types of sensing and monitoring systems. There may similarly be a variety of types of automatic checkout systems 110 that can be used with the system, such as a computer vision based (CV-based) variation, a wireless item tagging variation, a sensor fusion variation, a smart cart variation, a customer scanning variation, and/or any suitable combination or alternative approach to automatic checkout shopping. Herein, the CV-based variation is used as a primary example, but any suitable alternative may be used.

A CV-based automatic checkout system preferably includes a CV monitoring system 112 that uses a distributed camera system in monitoring and tracking customers and/or items through a shopping environment. Through a combination of various computer vision processes, a virtual cart can be generated for all customers or at least the customers that enroll for tracking. In one implementation, the CV-based variation can use object detection to identify products and detection of interactions with such objects in determining when a customer selects a product. The selection of a product may be detected when picking the item up from a shelf. Selection could alternatively be determined when placing a product in a cart or bag. The CV-based variation can use multiple cameras to track a customer through a store and to detect item selection throughout the shopping environment. Some implementations may use a single imaging device. In some variations, a CV-based automatic checkout system 110 can be used in parallel with an alternative second supplementary automatic checkout system 114. When a computer vision monitoring system used in combination with at least one other sensing and monitoring system, may be used to perform sensor fusion across the at least two monitoring systems and/or to provide as redundancy and validation between the at least two monitoring systems.

A CV-based automatic checkout system may be substantially similar to the one described in US Patent Application publication No. 2017/0323376, filed 9 May 2017, which is hereby incorporated in its entirety by this reference.

The CV-based monitoring system 112 will preferably include various computing elements used in processing image data collected by an imaging system. In particular, the CV-driven imaging system will preferably include an imaging system and a CV-based processing engine and data management infrastructure.

The imaging system functions to collect image data within the environment. The imaging system preferably includes a set of image capture devices. The imaging system might collect some combination of visual, infrared, depth-based, lidar, radar, sonar, and/or other types of image data. The imaging system is preferably positioned at a range of distinct vantage points. However, in one variation, the imaging system may include only a single image capture device. The image data is preferably video but can alternatively be a set of periodic static images. In one variation, the imaging system may collect image data from existing surveillance or video systems. In this variation the system includes an image data interface to collect and/or receive image data from live imaging devices or from a data record. The image capture devices may be permanently situated in fixed locations. Alternatively, some or all may be moved, panned, zoomed, or carried throughout the facility in order to acquire more varied perspective views. In one variation, a subset of imaging devices can be mobile cameras (e.g., wearable cameras or cameras of personal computing devices). For example, one implementation, the system could operate partially or entirely using personal imaging devices worn by humans in the environment. The image data collected by the human and potentially other imaging devices in the environment can be used for collecting various interaction data.

In a shopping environment, the imaging system preferably includes a set of static image devices mounted with an aerial view from the ceiling. The aerial view imaging devices preferably provide image data across stored products monitored for virtual cart functionality. The image system is preferably installed such that the image data covers the area of interest within the environment (e.g., product shelves). In one variation, imaging devices may be specifically setup for monitoring particular items or item display areas from a particular perspective.

A CV-based processing engine and data management infrastructure preferably manages the collected image data and facilitates processing of the image data to establish various modeling and conclusions relating to interactions of interest. For example, the selection of an item and the returning of an item are or particular interest. The data processing engine preferably includes a number of general processor units (CPUs), graphical processing units (GPUs), microprocessors, custom processors, and/or other computing components. The computing components of the processing engine can reside local to the imaging system and the environment. The computing resources of the data processing engine may alternatively operate remotely in part or whole.

The system may additionally include additional sensing systems such as a location tracking system. Location tracking can use Bluetooth beaconing, acoustic positioning, RF or ultrasound based positioning, GPS, and/or other suitable techniques for determining location within a gym. Location can additionally or alternatively be sensed or tracked through the CV monitoring system 112. In one variation, modeling of a CV-person can include detection of a modeled location within the environment. In another variation, location and view of an imaging device can be used to generate a general location property for a CV-person detected with image data of that imaging device.

A monitoring system may additionally include human-in-the-loop (HL) monitoring which functions to use human interpretation and processing of at least a portion of analyzing sensor data. Preferably, HL monitoring uses one or more workers to facilitate review and processing of collected image data. The image data could be partially processed and selectively presented to human processors for efficient processing and tracking/generation of a virtual cart for customers in the environment. HL monitoring may additionally be used in combination with CV-based automatic checkout system. For example, image data may be transmitted to a review system of a human processor when CV monitoring system 110 encounters a low confidence situation.

A wireless item tagging checkout system preferably uses an item tagging or tracking system to wirelessly detect the removal of an item from storage and/or the adding of an item to a physical cart, basket, or bag. RFID, NFC, and/or other suitable forms of wireless item tagging may be employed. In one implementation, items are supplied with an identifying RFID tag. A special basket for automatic checkout can include an RFID reader that that reads item RFID tags and adds the appropriate items to a virtual cart.

Figure 8:
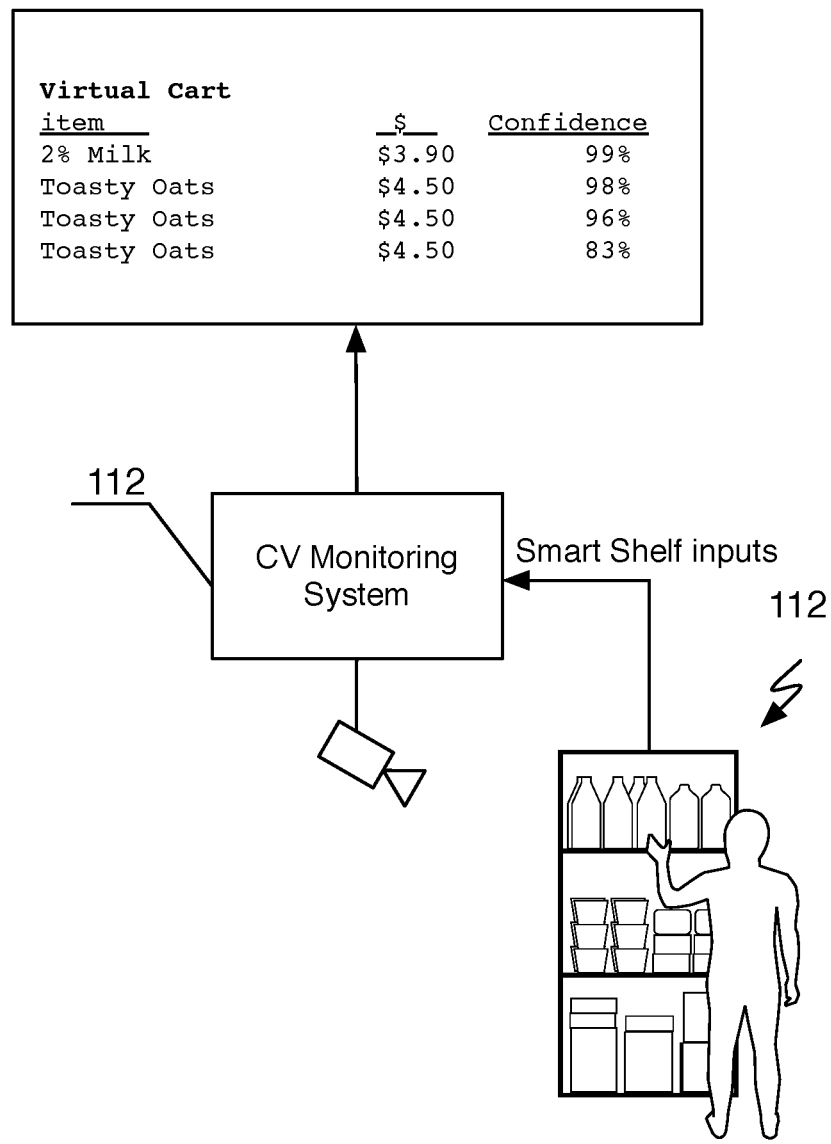
FIG. 8 is a schematic representation of smart shelving used in monitoring an agent.

A smart store infrastructure checkout system preferably utilizes enhanced carts, baskets, shelving, or other forms of smart infrastructure with sensing capabilities for maintaining a virtual cart as shown in FIG. 8. A smart cart variation preferably includes a cart used for storing items during the shopping process and that is enhanced with sensing capabilities. It can be appreciated that the smart cart can be a wheeled cart, a basket, a bag, a tray, or any suitable transportable receptacle for items. A smart cart can use localized variations of techniques described above such as CV-based approaches, RFIF, scales, bar code scanners, and/or other techniques for detecting and optionally measuring items as they are added to the smart cart. A virtual cart is preferably maintained that represents the current contents of the smart cart at any time. The smart cart enabled variation may additionally account for foreign objects that should not be included in the transaction portion of the virtual cart such as a customer's jacket. A smart shelving monitoring system can preferably include a scale, proximity sensors, optical gates (threshold detectors), cameras, and/or other sensors that can detect user interactions, changes in inventory stock, and/or other changes. This may be used in combination with a CV monitoring system 110 to facilitate tracking of virtual cart A customer facilitated checkout system preferably leverages active customer participation in maintaining a virtual cart during the shopping process. In some variations, a customer facilitated checkout system may include a set of barcode readers through which items can be scanned or added to a virtual cart as the customer shops. The customer preferably scans items at different places in the shopping environment as the customer shops. A customer facilitated checkout system additionally includes a customer application operable on a customer computing device that is used for entry of items into a virtual cart. Such a customer facilitated checkout system may rely on explicit entry of products but could alternatively transparently add items to a virtual cart during normal store interactions. For example, smart glasses may be used for detecting when a customer selects an item for purchase and present some feedback in substantially real-time of the addition of the new item.

A sensor fusion checkout system preferably uses a combination of multiple sensing techniques. Sensor fusion can rely on multiple inputs in generating a predicted virtual cart for a customer. For example, a sensor fusion variation may use computer vision, RFID tags, and scales or other sensors integrated into shelving or carts. In some implementations, a sensor fusion variation may have a primary sensing mode of maintaining a virtual cart and a one or more secondary sensing modes used to correct, validate, or otherwise improve the sensing of a customer's shopping process.

A monitoring system and more specifically an automatic checkout system could alternatively use any suitable combination of the exemplary checkout systems and sensing approaches.

The system and more specifically a CV-based automatic checkout system may additionally include a synchronization model that functions to establish associations between CV-people, CV-agents (e.g., shopping carts, shopping baskets), user-records, user-accounts, devices instances (e.g., user application instances, checkout stations, customer directing infrastructure, and the like), and/or other associative elements. In some implementations, the automatic checkout system 110 has an integrated mechanism for tracking and identifying customers (or alternatively carts). A synchronization model is primarily used to establish associations of virtual carts generated for CV-people of customers as they approach a checkout region. A synchronization module preferably includes configuration to apply computer vision using facial recognition, near-field communication with a user or cart computing device, or other suitable approaches to map different elements together. In one basic implementation, before exiting, the user performs some action that facilitates identification such as displaying a QR code on a self-checkout app or tapping a phone to an NFC or RFID.

The system may additionally include a synchronization engine 400 that preferably includes configuration to establish an association between a virtual cart, CV-person, and a payment mechanism stored as part of an account-record. This may be used to execute a financial transaction transparently during a checkout process. The synchronization engine 400 may additionally include configuration to associate a CV-person with a computing device in the environment (possibly detected through the CV monitoring system). This association may be used to transfer virtual cart data, checkout processing information, assessment information, and/or other data to the computing device (e.g., a checkout station or a user application).

While the system is preferably used in combination with an automatic checkout system 110, alternative embodiments may operate with more traditional checkout kiosks or self-checkout kiosks and still provide a variety of operational benefits.

Evaluation Engine

The evaluation engine 200 functions to generate an assessment of the modeling of an agent within the environment. The resulting assessment is preferably used in altering an interaction or transaction. In a preferred variation, the evaluation engine 200 includes or is a customer evaluation engine 210, which functions to generate an evaluation of conditions for a checkout process for a customer. The customer evaluation engine 210 can be based in part on the virtual cart of the customer.

Alternative, types of evaluation engines 200 may classify different agents for triaging agents for customized interactions. More generally, an agent evaluation engine can be configured to assess different agents modeled within the environment. For example, carts, baskets, and humans (e.g., customers) may be modeled as possessing different items in a virtual cart.

In one variation, the agent monitoring system 100 is used for tracking customer location within a store and optionally detecting video of possible item interactions, this may then be relayed to HL system for at least partial human analysis for completion of a virtual cart/checkout list. This may be performed asynchronous to the shopping interactions of the customer. In this way the evaluation engine 200 may be an analysis of quality of this monitoring process. If tracking of a customer is lost for periods of time or there are other issues, then the evaluation engine 200 may flag such interactions, which can be used to alter checkout processing.

Herein, the evaluation engine 200 is primarily described as it applies to a customer evaluation engine 210, but additional or alternative systems may be used.

An assessment generated from a customer evaluation engine 210 is a preferably a logical determination of a checkout recommendation based on factors relating to financial impact, customer experience, store responsibility, and/or other factors. In a basic implementation, the assessment output of the customer evaluation engine 210 can be used in allowing a customer to complete an automatic checkout process if the virtual cart is trusted or redirecting the customer to another checkout process if an issue needs to be resolved before completing checkout. More typically, there will be a wide variety of assessment result options that may require different actions, and the customer evaluation engine 210 can aid in determining and triggering those actions.

The customer evaluation engine 210 can include a variety of inputs used in generating an assessment. One preferred input is the virtual cart information such that the evaluation engine is configured to generate an assessment of the virtual cart. The virtual cart information can include an item list, the certainty of an item prediction, a set of possible candidates for an item, the cost of an item, the total cost of items, special item conditions, and/or other properties relating to a current virtual cart. Special item conditions may relate to particular items that require particular actions like checking ID for the purchase of alcohol. Items commonly stolen or that are controlled substances may also be marked, or weighted, with a special item condition such that extra vigilance can be used when such an item is in question. For example, possession of particular item in a virtual cart may result in an assessment that results in a facilitated checkout process so that ID can be inspected.

Purchase history may be another input to the customer evaluation engine 210. Purchase history information can be purchase history for the particular customer or for a larger population of customers. Purchase history may be used to determine if the set of purchased item is within normal expectations. For example, it may be uncommon for a customer to purchase ten milks.

A customer profile may be another input to the customer evaluation engine 210. Customer profiles may relate to loyalty of the customer or lifetime value of a customer. Such metrics may be used in adjusting the trustworthiness of a customer. In one example, the assessment may vary depending on if the customer is new and largely an unknown variable or if the customer is a very frequent shopper at that location.

The customer evaluation engine 210 can additionally include cost-benefit configuration inputs that can be used in determining sensitivity thresholds for making assessment judgments. In one variation, cost-benefit configuration may be set to enable the system to permit the checkout of virtual carts with potential issues if the financial impact of allowing that checkout is less than the value of a better customer experience. For example, a loyal customer may be allowed to have an automatic checkout even when the uncertainty of a particular item may mean that the store misses out on potentially twenty cents. However, a new customer may still be flagged and directed to resolve the virtual cart issues relating to the twenty cents. Such cost-benefit configuration options may be globally set but could alternatively be set differently depending on the particular item, item classification, or other suitable factors.

In one variation, the system may include an assessment administrator interface, which functions to enable an administrator or store operator to set, customize, or otherwise modify the assessment configuration. In one implementation, an assessment administrator interface can include configuration presenting global assessment engine options. In another implementation, an assessment administrator interface can include configuration presenting per-item customization of assessment.

The assessment output of the customer evaluation engine 210 may have various forms. The output of the customer evaluation engine 210 is preferably a communication or data representation that can represent a recommended action to be initiated by the system. The assessment is preferably communicated or otherwise made available to various checkout guidance tools 320 used to facilitate automatic checkout.

A first potential assessment output result can be an assessment triggering the automatic checkout of a customer. An assessment that indicates that the certainty of the virtual cart is above a minimum threshold will generally trigger permission for automatic checkout by a customer. The customer profile, purchase history, cost-benefit analysis, and other conditions may also be considered in setting an assessment that permits automatic checkout. Such an output can be used to initiate charging the customer and/or communicate to the customer that they can or have completed an automatic checkout. In one example, a digital sign may change its display mode to direct the customer to an automatic checkout aisle where they can preferably exit the store without any explicit checkout process at a kiosk or with a worker. In another example, a customer may receive a push notification, email, or other form of communication, of the shopping total and then confirmation when they have been charged. In another example, a checkout station may have an at least partial itemized list of items for purchased automatically entered into the checkout station, preferably alleviating the customer or a worker from entering those items.

Another potential assessment output result can be an assessment triggering a facilitated checkout and/or preventing an automatic checkout. Such an assessment is generally because of uncertainty in some portion of the virtual cart, but other rules could also be used. A facilitated checkout is a checkout process that requires some activity at or near the checkout region to complete a checkout. Generally, a facilitated checkout will include the traditional checkout processes of normal worker-stationed checkout kiosks and/or self-checkout kiosks that rely on customer bar code scanning.

Figure 9:
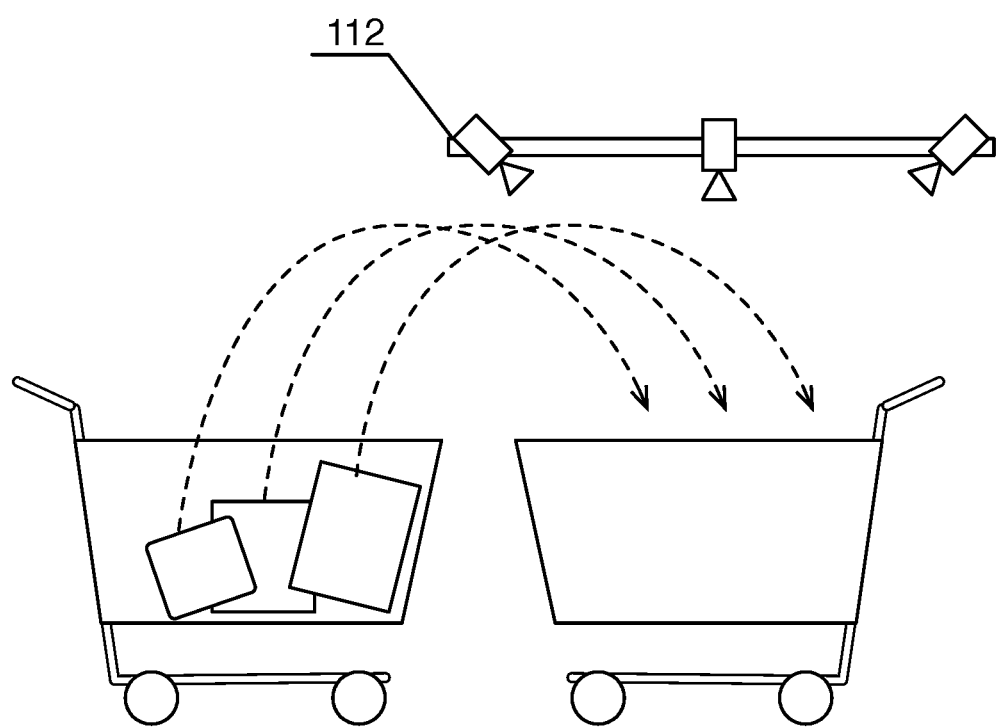
FIG. 9 is a schematic representation of using an assisted checkout process.

An assisted checkout processes may also be available as a facilitated checkout option. An assisted checkout process may leverage the partial awareness of a customer's cart provided by the automatic checkout system 110. The assisted checkout process may be used by a worker station or by a self-checkout station. In one variation, an accelerated self-checkout process can use parts of a virtual cart to more readily or accurately scan items during an item scanning process. For example, since most of the items are known, a basket may be emptied onto a table or into another cart while supplemental data is collected of the items as shown in FIG. 9. Unknown items may be indicated during the transfer for clarification. This process avoids the need to individually scan the items. In another variation, the assisted checkout process may ask for particular items to be scanned such as all the produce to be scanned or any drinks.

An assessment that triggers a facilitated checkout may additionally signal a worker to redirect a particular customer or to assist a particular customer in a facilitated checkout. In some variations, an app used by the worker may be automatically transitioned to a mode where an assisted checkout process can be executed for that particular customer. A questionnaire in the app may present generated checks to be completed by the worker, and the responses to the checks may alter the understanding of the virtual cart. Triggering a facilitated checkout may alternatively include activating a digital sign, turnstile, or other store infrastructure to direct a customer to an appropriate checkout region.

Alternative or additional assessment output results may be generated. In one variation, different items or collections of items may have customized processing rules. For example some products may require age verification such as alcohol. A worker or customer may be notified to present ID when using the automatic checkout process. Failure to do so may trigger an alert. Approval by a worker can allow the automatic checkout process to proceed. In some cases age-verification may be conveyed by a smartphone app originating from self-reported consumer response, or a supervised one-time verification process such as TSA-pre screen.

The customer evaluation engine 210 may be activated for a customer or cart in preparation for checking out. In one variation, the customer evaluation engine 210 is activated and an assessment is generated as the customer approaches or enters the checkout region. In another variation, the customer evaluation engine 210 may be continuously or periodically updating the state of the assessment for a customer. In some cases, corrective action for a virtual cart in a bad state (e.g., high uncertainty for a possible item selected by the customer) may be addressed before approaching a checkout region by using a corrective tool distributed in the shopping environment.

Checkout Region

The checkout region is preferably a region where the checkout process transpires. The checkout region is preferably near or convenient to an exit of a shopping environment. The checkout region is preferably in proximity to where a checkout process is finalized or initializes completion. In some cases, the checkout process may not complete until after the customer leaves the store in the case of an automatic checkout.

In one variation, the checkout region includes a distinct automatic checkout region and a facilitated checkout region (e.g., a traditional checkout aisle with worker and point of sale device). Alternatively, the different types of checkout processes may not be isolated to distinct regions. For example, a customer may be allowed to walk through a traditional checkout aisle but using an automatic checkout process.

In one exemplary implementation, an automatic checkout region and facilitated checkout region may be adjacent or in near proximity, but the automatic checkout region and the facilitated checkout region may alternatively be at distinct regions. For example, automatic checkout may have an exit on one side of the building and facilitated checkout near another side. There may additionally be multiple checkout regions. An automatic checkout region can be an open region that is characterized by allowing multiple customers through simultaneously. An automatic checkout region may alternatively be channeled using various pieces of infrastructure to restrict customers to pass through a more controlled exit. Different types of automatic checkout regions may work better for different shopping environments.

The checkout region will preferably include various pieces of infrastructure to guide customers such as aisles, signage, turnstiles, barriers, gates, and/or other elements. The arrangement and layout of customer directing infrastructure may include configurations that facilitate selective direction of customers based on individually determined checkout process. For example, customers wanting to use automatic checkout will proceed to an automatic checkout region while those planning to use a traditional checkout process will proceed to a traditional checkout region. In another variation, customers are channeled through a mixed region and then appropriately directed. Other suitable configurations may alternatively be used.

The layout of the checkout region and its various sub-regions may additionally be used in coordinating different system interactions. Different actions may be triggered at different times or locations as customers are tracked through the checkout region. For example, the checkout region may have a region when a customer is directed to automatic checkout and a region where the checkout process is executed and a customer charged or credited for a purchase. There may additionally be a region where worker intervention is triggered if, for example, an unpermitted customer attempts to exit through the automatic checkout aisle.

Additionally, other special regions could include entry regions or check-in regions where a customer may have some interaction upon entry. For example, a customer registered with a payment mechanism may be notified of an out of date. In another variation, a check-in gate may ask a customer to check-in using an application or some other mechanism. For example, an application may display a QR code that can be read by an check-in gate to detect an account to use for checkout processing. In some cases, a sub-population of customers may not use the check-in gate. For example, some customers may opt to not use the features offered through check-in. Such check-in stations may additionally be distributed in places within the environment other than the entrance.

Some implementations may make use of such discrete regions and different types of regions where agent location relative to a region alters interactions. However, other implementations may not make use of all or any forms of region specific behavior. For example, one implementation may trigger assessment and checkout processing in response to an alternative external trigger such as when a customer selects an option to conclude a checkout process.

Different environments and different store types may prompt different configurations of the checkout region. The system can preferably be made to work for a wide variety of shopping environments such as grocery stores, convenience stores, bulk-item stores, pharmacies, book stores, warehouses, malls, markets, and/or any suitable environment that promote commerce or exchange of goods.

As a first example, a store may have a region in which all customers pass as they move to checkout. Qualifying customers can be directed through an open exit for automatic checkout while non-qualifying customers (e.g., customers not wanting to use automatic checkout, unenrolled customers, customers with virtual cart issues, and the like) can proceed to other checkout options.

As shown in FIG. 1, the automatic checkout region may be an open region that permits multiple people through at once. The automatic checkout region may alternatively be configured so as to channel customers through in an organized fashion (e.g., single file). In one variation, all customers or at least those that want an option for assisted or facilitated checkout may proceed through a channeled processing line. The processing line may include supplemental sensing capabilities of the automatic checkout system 110. For example, customers may proceed through a gate with high resolution cameras mounted at multiple angles and optionally other sensors.

Agent Processing System

An agent processing system 300 of a preferred embodiment functions to perform some action based in part on the output of the evaluation engine 200. In some preferred implementations, the action executed by the agent processing system 300 is coordinated with the location of a customer such that an action based in part on the evaluation engine 200 is triggered at an appropriate time. In the context of checkout processing, the agent processing system 300 may be more specifically described as a checkout processing system 310, which is used in some way to facilitate, regulate, or manage some aspect of the checkout process. A checkout processing system 310 may be or include one or more checkout guidance tools 320, which may function as sub-systems of the checkout processing system 310.

Preferably, the checkout guidance tools 320 function to assist in directing the checkout process of customers. The system may include one or more checkout guidance tools 320 directed to different objectives including those for assessment communication, customer direction, and problem resolution. Multiple objectives may be addressed by one checkout guidance tool 320, but different checkout guidance tools 320 may fulfill different objectives. Additionally, there may be redundancy in the objectives. For example, a digital sign may be used to automatically direct customers, but a worker application may similarly provide guidance on how customers should be directed so that a worker could assist. A checkout guidance tool 320 can be configured to dynamically set a checkout operating mode based on part on the assessment.

Some variations of checkout guidance tools 320 may be usable by a worker. Other variations of checkout guidance tools 320 may be usable by a customer. User applications and/or hand held computing devices may be one form of the checkout guidance tool. Other variations of checkout guidance tools 320 may be integrated into store infrastructure such as signs, displays, turnstiles, checkout stations, and the like.

As one variation, checkout guidance tools 320 may include customer-directing infrastructure, which function to dynamically signal or communicate to a customer. Customer directing infrastructure can be configured to update presentation or communication of information based on the assessment and/or other conditions. In response to actions of a customer-directing infrastructure, the customer may be notified and directed based on when an automatic checkout process can be used, when a traditional checkout process should be used, when an assisted checkout process can be used, when a worker should be consulted before automatic checkout, and/or any suitable information.

Customer directing infrastructure preferably includes at least one dynamic element that can be used to communicate. In one variation, the customer-directing infrastructure is a controllable sign or display. As one example, a sign may have an arrow pointing toward the automatic or facilitated checkout region and that illuminates in response to the assessment of an approaching customer. In another example, a graphical display can be updated to communicate to approaching customers. In a similar variation, controllable floor or pathway indicators can be illuminated.

Figure 10:
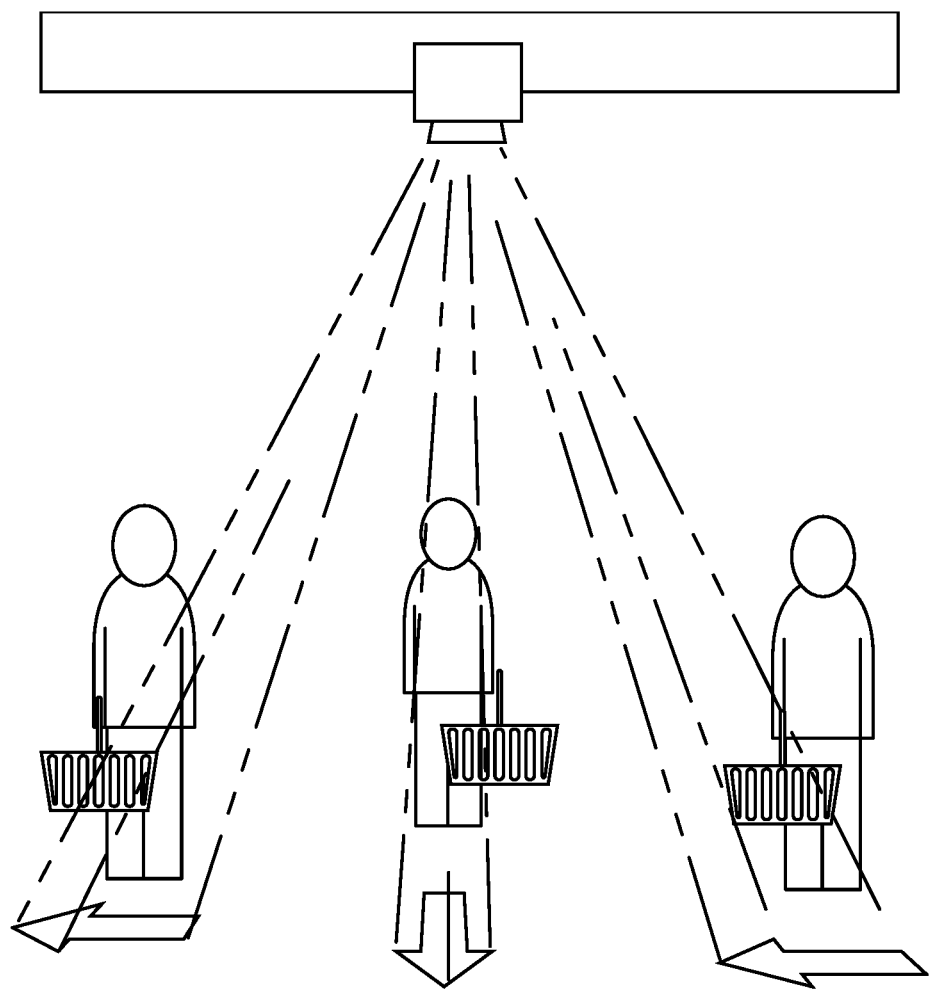
FIG. 10 is a schematic representation of a projector-based customer directing piece of infrastructure.

In another variation, overhead projectors may be used to project directions onto customers, carts, or the ground. Customer tracking can be used in combination with the projectors. In this variation, multiple customers can receive individualized instructions across a wide area as shown in FIG. 10.

In another variation, directed audio may be played for customers. The audio is preferably directed so that customers in a limited zone can hear personalized direction. Customer directing infrastructure could include an audio system that plays audio that communicates directions to the customer. In one implementation, the audio system is a directed audio system where activation of the audio is coordinated with a customer's location being within the audible region of the targeted audio system. Alternatively, audio of a personal computing could be used to communicate audible directions.

Figure 11:
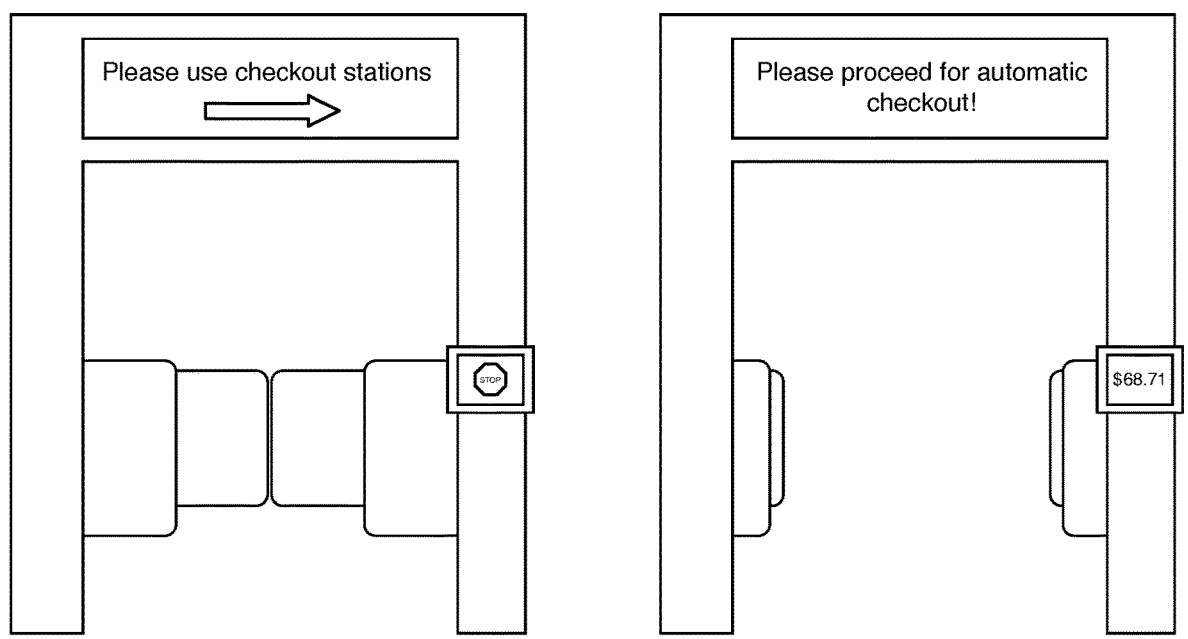
FIG. 11 is a schematic representation of automatic turnstiles used in controlling access to an automatic checkout region.

In another variation, a turnstile or controllable gate may be actuated to direct a customer or to create an opening to one of the checkout processes. As an example shown in FIG. 11, a controllable turnstile may open up an access way to an automatic checkout region when a qualifying customer approaches and close.

In one variation, carts or baskets used by a customer may have a user interface element that can be used to direct a customer. For example, an indicator light may turn green when automatic checkout is available and red when a traditional checkout process should be used.

Figure 12:
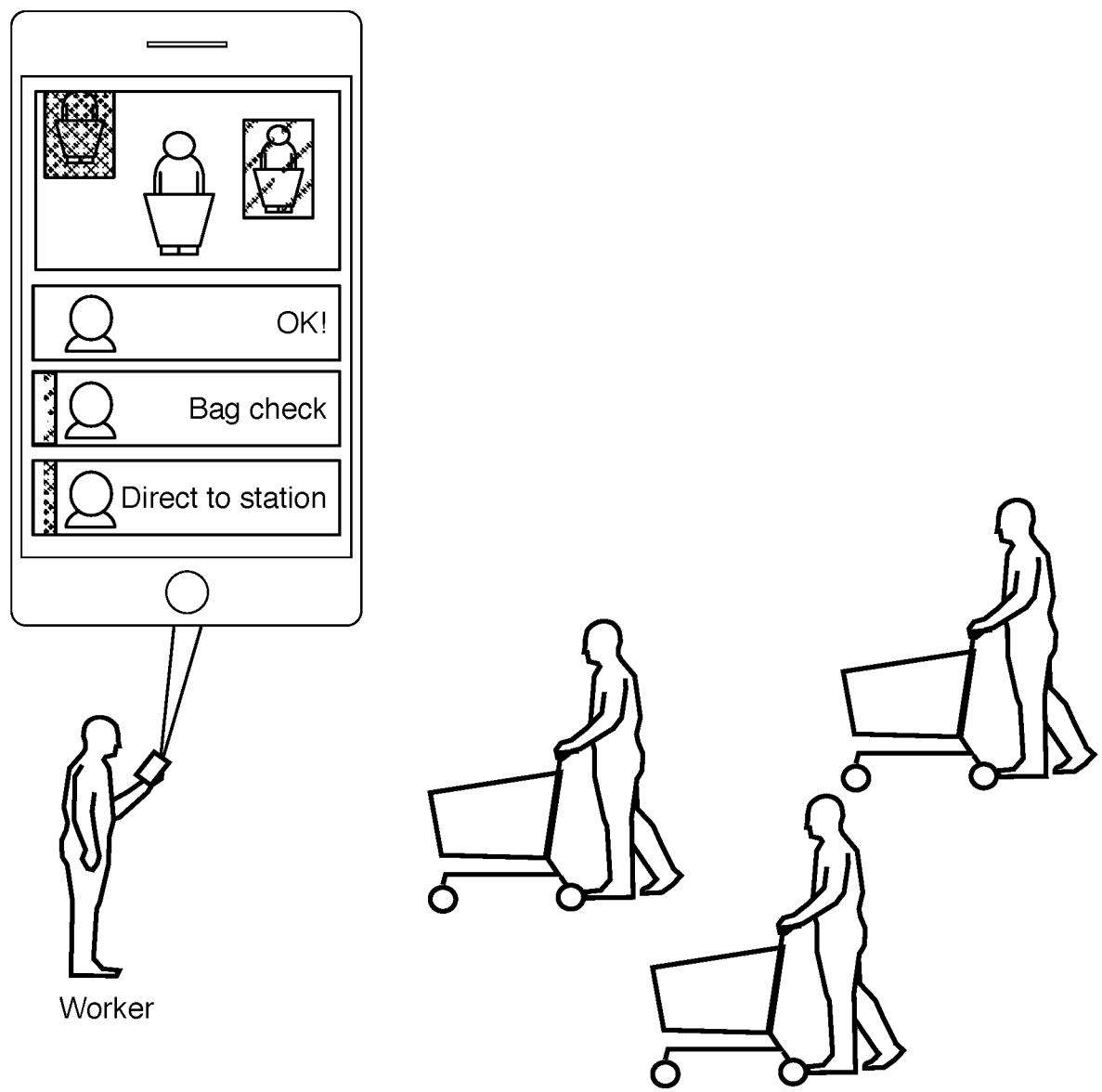
FIG. 12 is a schematic representation of a variation of a worker application.

A checkout guidance tool 320 could also include a worker application, which functions as a worker specific user application. The worker application can be configured to present assessments of one or more customer. Preferably, the reported customers are in proximity to a checkout region and/or the worker application/device as shown in FIG. 12. The worker application can act as a dashboard to facilitate one or more workers overseeing a checkout region. A worker application may be an application instance installed in a computing device such as a phone, tablet, smart glasses, or other suitable computing device. A worker application may additionally or alternatively be a custom designed computing device such as a dedicated hand held device for inspecting customers. For example, a dedicated worker device could enable checkout assessment to read by directing the worker device at a customer.

The worker application may include a customer inspector module that presents information relating to a customer and/or the virtual cart. The customer inspector module may provide real-time information on customers approaching, entering, or exiting an automatic checkout region. In one implementation, the customer inspector module is a rendered augmented reality interface configured to selectively highlight different customers based on assessments and/or other properties. The customer inspector module could additionally expose controls so that a worker could assist a customer in resolving or adjusting the virtual cart. For example, items may be removed, added, price adjusted, discounted, refunded, or changed in any suitable way through the worker application.

The worker application may additionally receive notifications, alerts, or directions on how to handle customers. For example, an alert may be triggered on a worker application when an unqualified customer is walking through an automatic checkout region.

A worker application may additionally or alternatively include a cart issue resolution tool as described below.

Figure 13A:
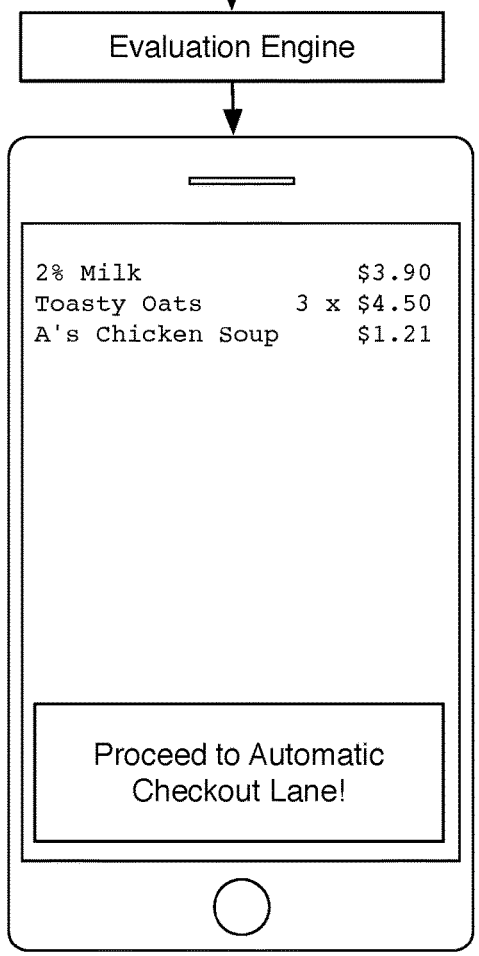
FIGS. 13A and 13B are schematic representations of a customer application based on different checkout processing modes.
Figure 13B:
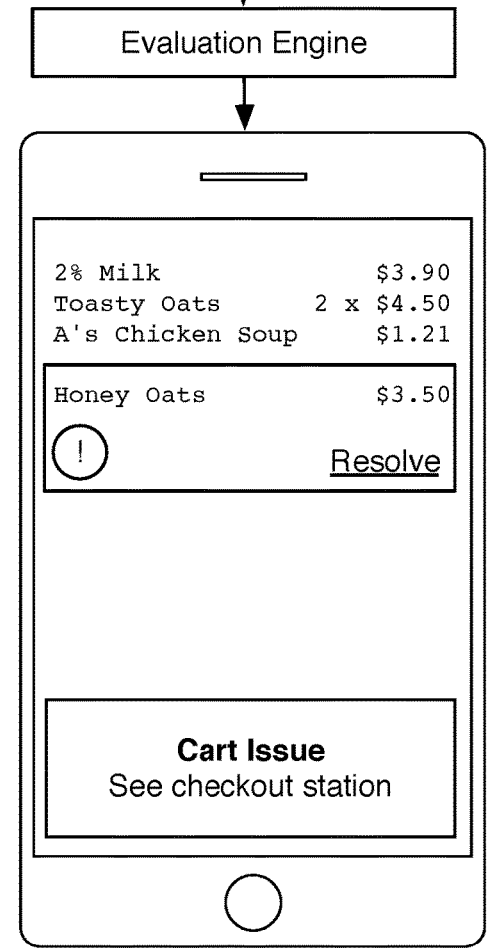

A checkout guidance tool 320 could alternatively be a customer application, which functions to expose information and particular actions to a customer. The customer application is preferably integrated with the automatic checkout system 110 and such that the virtual shop of a customer can be updated in real-time as the shopper selects items. The customer application can include a virtual cart inspector that enables a customer to review and make approved edits to a virtual cart. In some cases, a cart issue resolution tool can be integrated into the customer application such that a customer can assist in resolving an issue with a virtual cart as described below. The customer application can additionally receive push notifications. Preferably, the customer application is configured to present checkout processing status as shown in FIGS. 13A and 13B. A customer may receive notifications when a customer is allowed to use an automatic checkout process (or not), as confirmation of a successful automatic checkout, when the system needs assistance in resolving an item, or for any suitable event.

A cart issue resolution tool functions to resolve issues in a virtual cart. Resolving an issue generally involves increasing the confidence in the accuracy of the virtual cart for one or more items. Different variations of a cart issue resolution tool may be usable by different parties such as workers and customers.

Figure 14:
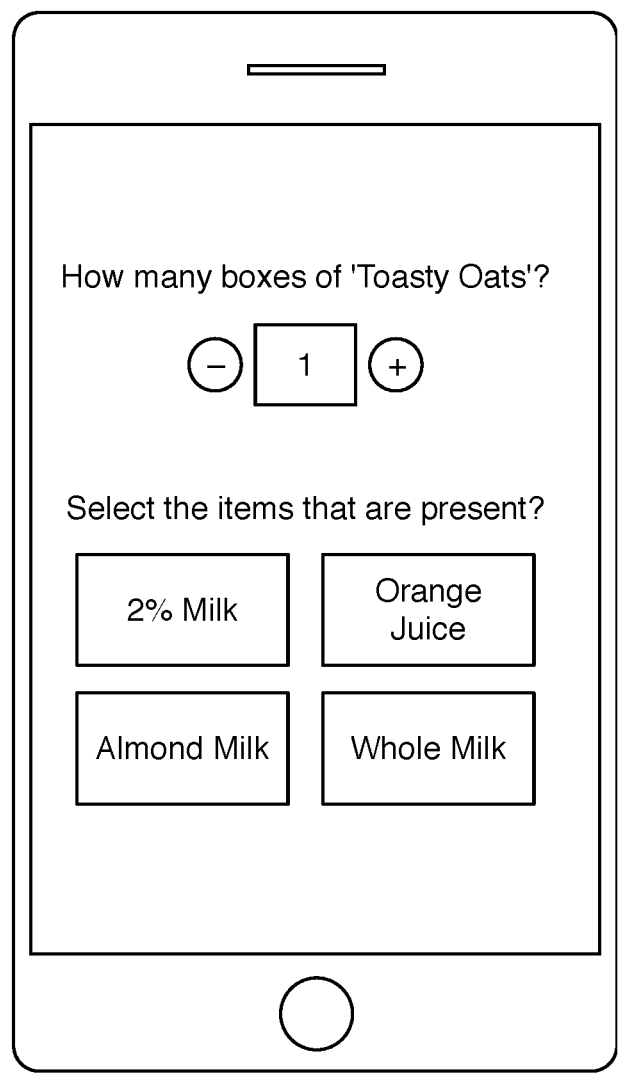
FIG. 14 is a screenshot representation of a questionnaire used in resolving issues with a virtual cart.

In a first variation, a cart issue resolution tool includes configuration to present a generated questionnaire that may be presented on the worker application and/or a customer application as shown in FIG. 14. The generated questionnaire preferably includes one or more checks related to the items selected by the customer. A check could be for the number of items selected, which version of a particular item was selected, confirmation that an item was selected, and/or any suitable question. The checks are preferably generated based on the deficiencies indicated in the assessment. Additionally, the checks may be dynamically generated as responses are collected so that the information collected can adjust based on the current level of understanding of the virtual cart.

The customer is a partially untrusted party, and so the customer version of a generated questionnaire may also assess the credibility of a customer's responses. In one implementation, some portion of the answers are known with high confidence and the customer's response to those known checks can be used to score the amount of trust that should be placed on the customer's response. Other checks can still be used to resolve particular issues with the virtual cart. When a customer is untrusted the system may prevent or avoid the option of a customer questionnaire to resolve virtual cart issues. Credibility checks can additionally be used with workers periodically to validate reliability.

Figure 15:
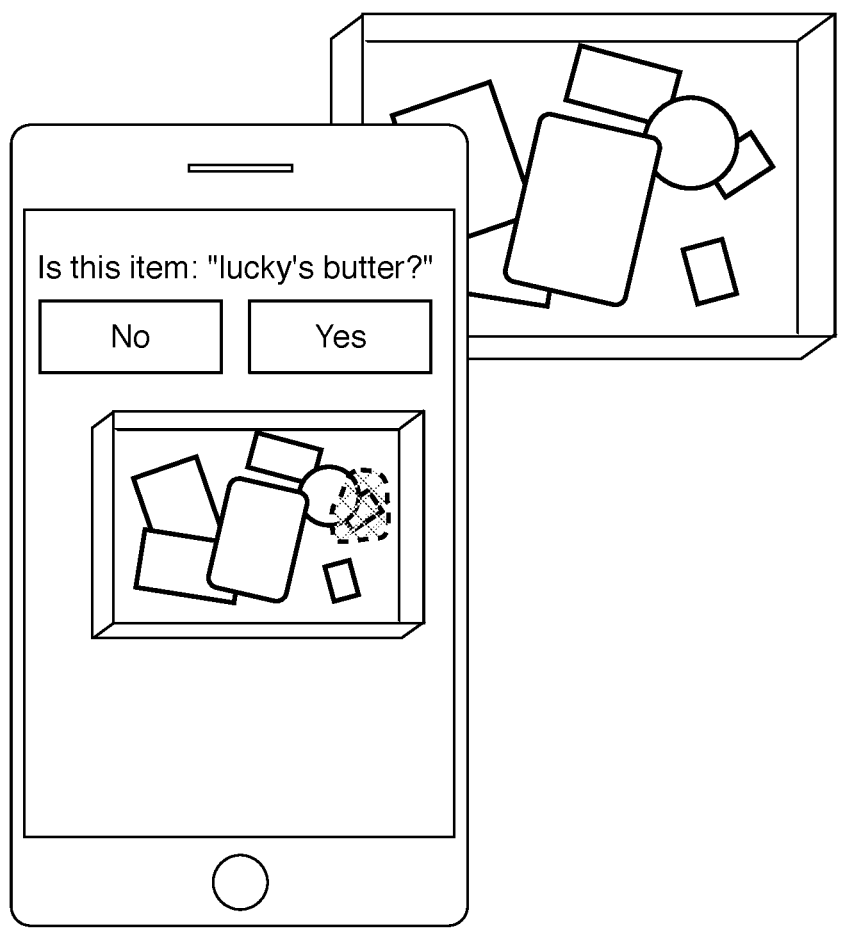
FIGS. 15 and 16 are schematic representations of AR-based cart issue resolution tools.
Figure 16:
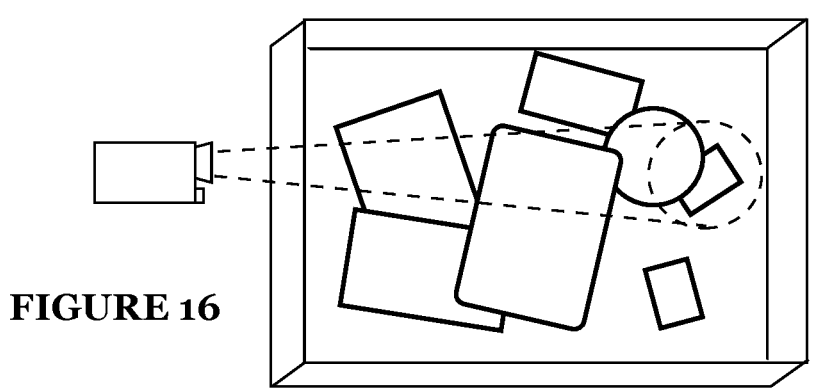

In another variation, a cart issue resolution tool can include a mechanism to scan or identify particular items in a cart. One potential issue in resolving a cart is that a significant portion of the cart may be well understood, and finding the one or more items with less certainty can be challenging. An augmented reality (AR) version of a cart issue resolution tool can preferably provide guidance in identifying and collecting data on items with issues. A user application with an AR-based cart issue resolution tool variation can be operable on a hand held computing device that includes a display and at least a camera. The camera may be used to collect images that can be used to supplement the CV-based analysis of a cart. The display and camera may operate cooperatively to provide an augmented reality interface that highlights particular items needing action as shown in FIG. 15. In one implementation, unidentified items may be highlighted in the display of the camera image while identified items can be marked affirmatively or left unmarked. This can be used by a worker to quickly "scan" a customer's cart or basket to identify the unidentified items. Accordingly, a worker may use a cart issue resolution tool by inspecting a cart, sifting through items, and then assisting in collecting image data to identify items that were inadequately identified previously. An alternative implementation of an AR-based cart issue resolution tool could be a projected augmented reality device that has a camera used in combination with a projector. Such a device may have a form factor like a handheld flashlight, and that when directed at a cart with issues, illuminates different sections of the cart to guide the worker in resolving issues as shown in FIG. 16.

A checkout guidance tool 320 could alternatively be a checkout station, which functions to be a dedicated device to processing a checkout transaction. A checkout station may be a worker-staffed checkout station or a self-checkout station. A checkout station will generally include at least one computing unit, a screen, at least one form of payment mechanism (e.g., credit card reader, cash receiver, change producer), and/or a receipt printer. A checkout station may additionally include a barcode scanner, a scale, and/or other elements. In a preferred implementation, the entering of items can be augmented by the system. Other variations, may augment operation of a checkout station in other ways. For example, payment mechanisms, loyalty cards, digital coupons, and/or other features based on the agent monitoring system 100 and/or the assessments may be selectively applied to the checkout station.

Figure 17:
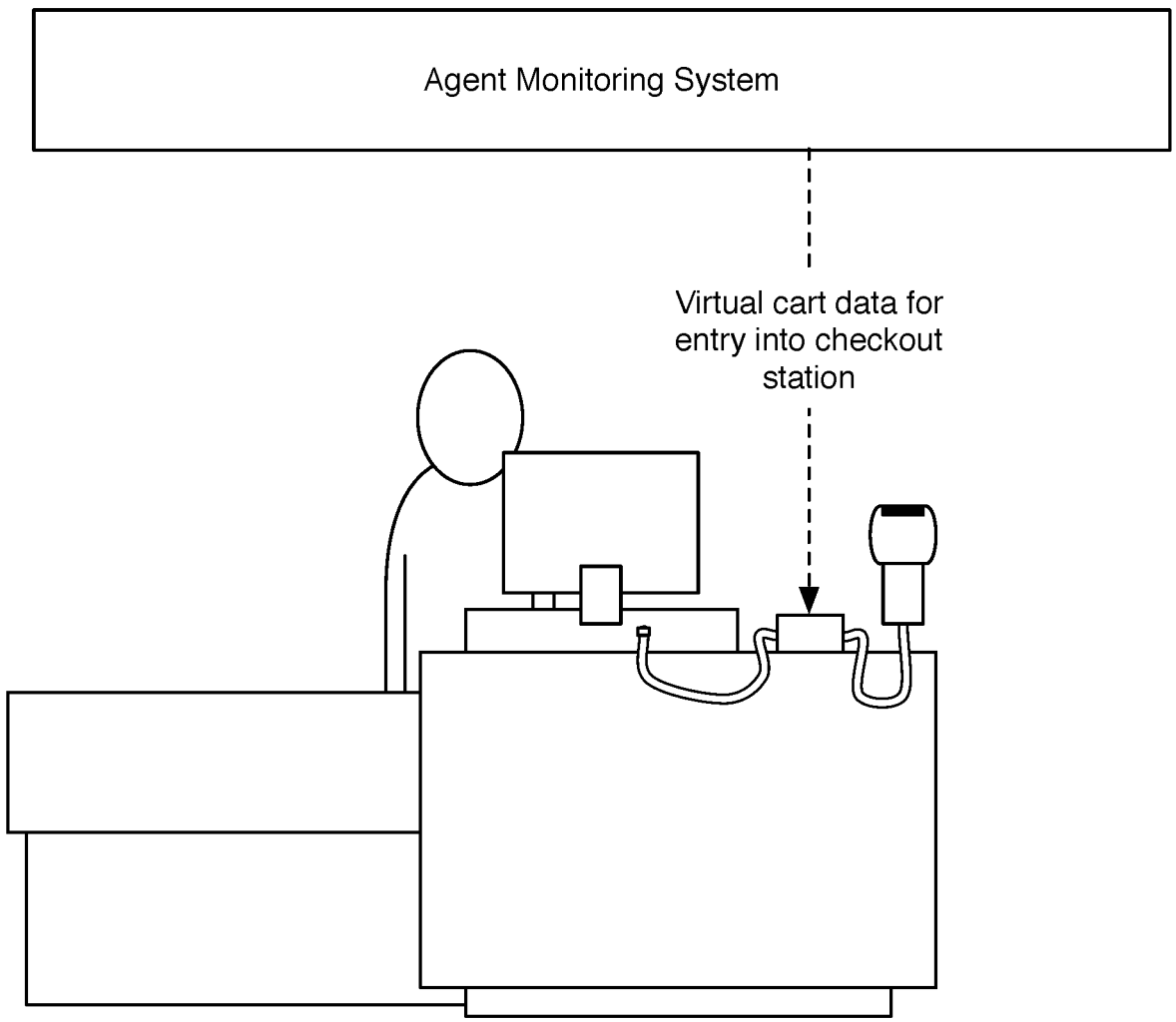
FIG. 17 is a schematic representation of dynamic checkout processing modes used in combination with a checkout station.

In some variations, the checkout guidance tool 310 may be an checkout station interface device, which functions to interface with an outside checkout station. A third party checkout station may provide a data protocol in which the interface device can interact with the checkout station. In other variations, the interface device may impersonate an expected form of data entry. For example, the interface device could be a keyboard or barcode scanner emulator (i.e., product entry emulator) that includes a communication module and product entry module. The product entry emulator may connect to a checkout station using a standard electrical interface like a USB interface. The communication module functions to allow the device to be remotely controlled. The system may wireless direct the product entry emulator to enter several product codes to automatically enter items from a virtual cart. The product entry module generates the appropriate electrical signals for communicating with the checkout station. This is generally a series of simulated keyboard key entries. In some implementations, such a device may connect through a USB or other data port and simulate a sequence of keyboard key inputs in the pattern of product identifiers. The product entry emulator may additionally include an interface to one or more product entry devices (like a barcode scanner or a keyboard) such that the product entry emulator can be used in line with such entry devices as shown in FIG. 17.

A checkout station can preferably operate in one or more operating modes. The checkout station preferably has an operating mode that is an automatic checkout mode that is configured to automatically enter items from the virtual cart. The automatic checkout mode is preferable engaged when the virtual cart and its assessment qualify. The checkout station may include a manual mode, which could be a default mode where items are manually entered. The checkout station may additionally include some form of assisted mode. A checkout station within the environment may be configured to switch between modes based on the customer and virtual cart. A set of checkout stations may alternatively be configured to operate in a single mode and customers are selectively directed to appropriate checkout stations.

An assisted checkout station can be an alternative type of checkout station. The assisted checkout station is preferably a checkout station that includes an item identification system that is used in cooperation with a virtual cart. It will sometimes be the case, where a large number of items in the virtual cart are known with a high level of confidence. It may also be the case, that a subset of items disqualifying the virtual cart for automatic checkout are predicted but with less than ideal levels of confidence. The assisted checkout station can thus accelerate the checkout process (performed by a worker or a customer) by opening up alternative ways of scanning items. In one variation, items are simply removed from a cart, basket, or bag and set down on a platform or in another cart as shown in FIG. 9. In another variation, the items can be transferred from one carrying item to another (from one basket to another basket). A series of sensors are positioned at the platform so as to identify items on the platform. In a CV-based system one or more cameras collects visual data of the items. The assessment of the virtual cart can be updated as the assisted checkout station is used. A signal can be triggered when the assessment become satisfactory for automatic checkout. In one variation, the assisted checkout station may additionally support checking-in customers (linking accounts with a virtual cart) and/or accepting payment for virtual carts using more traditional payment techniques such as. In this variation, a customer may have a virtual cart without issues but use the assisted checkout station to complete payment or use some alternative checkout option such as entering coupons, gift cards, vouchers, editing a virtual cart because of a last minute change, or any suitable customization task.

In some cases, the assisted checkout station may include a user interface that can direct the process. For example, the user interface may inform the worker or customer to place particular items that need verification on the platform first.

The system may include multiple combinations of the subsystems described herein. Alternatively, one or more variations could be implemented in isolation. For example, the system may be a form of checkout station, customer-directing infrastructure, worker application, or customer application.

In one exemplary implementation of the system, the system may be implemented as a checkout station in communication with an automatic checkout station. The checkout station may have at least one automatic checkout mode wherein a virtual cart of a customer in close proximity is automatically entered into the checkout station.

In another implementation of the system, the system may be implemented as a customer-directing infrastructure, wherein a digital sign, audio system, display, or other suitable system is updated to dynamically direct customers.

In another implementation of the system, the system may be implemented as a worker application, wherein data on customers in near proximity can be automatically synchronized to the worker application. The worker application may additionally update to different checkout processing features based on assessment and conditions of a virtual cart associated with a customer. The worker application is preferably updated to show multiple customer related data at different times. Data for multiple customers can additionally be presented simultaneously.

3. Method

Figure 18:
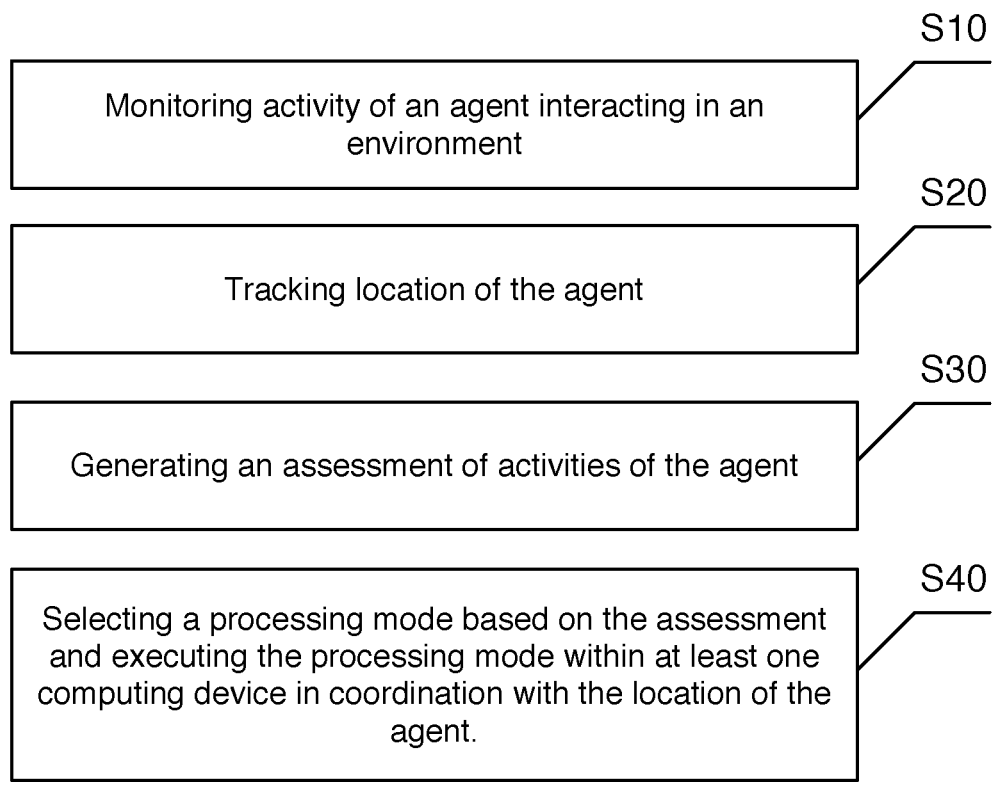
FIG. 18 is a flowchart representation of a method of a preferred embodiment.

As shown in FIG. 18, a method for dynamically altering an interaction experience of an agent can include monitoring activity of an agent interacting in an environment S10, generating an assessment of activities of the agent S30, and selecting a processing mode based on the assessment and executing the processing mode within at least one computing device S40. Some variations of the method may further include tracking location of the agent S20 and executing the processing mode within the at least one computing device in coordination with the location of the agent.

The method preferably functions to deliver customized interactions to different agents based on sensed or detected attributes and more specifically a history of interactions within an environment. The method is preferably used in shopping environments where the agent is a customer and where the method is used for altering a checkout process. The method may alternatively be applied in any suitable environment and used for altering any suitable type of experience such as space usage, item rentals, worker operations, and other computer-enabled experiences.

Accordingly, an exemplary implementation of the method may include monitoring activity of a first agent in the environment and monitoring activity of a second agent in the environment S10; tracking location of the first agent and location of the second agent S20; generating an assessment of activities of the first agent and generating a second assessment of activities of the second agent S30; and selecting a processing mode for the first agent based on the first assessment and executing the processing mode in a first computing device and selecting a second processing mode for the second agent based on the second assessment and executing the second processing mode in a second computing device S40. The first and second computing devices may be the same device, but could alternatively be distinct devices. Additionally, selection of a processing mode for the first and second agents may additionally be based on other associative properties and in some cases may result in selection of a processing mode that results in a shared processing mode where the first and second agent have a merged interaction. In the case of automatic checkout, virtual carts of the first and second agents could be merged and used in a checkout process and/or communicated to a checkout station. For example, items selected by a couple could be grouped when they approach the same checkout station and charged as a single transaction. Additionally products tracked as being associated with a physical cart and products tracked as associated with a bag or held by a human may be two virtual carts that are merged for a single checkout process. Within the checkout station, the customers could additionally reconfigure the checkout process to split the list of items so each customer pays for their respective items.

Herein, the method is primarily described as applying to a shopping application but may alternatively be used in any application involving monitoring the exchange of goods in and out of an environment.

Figure 19:
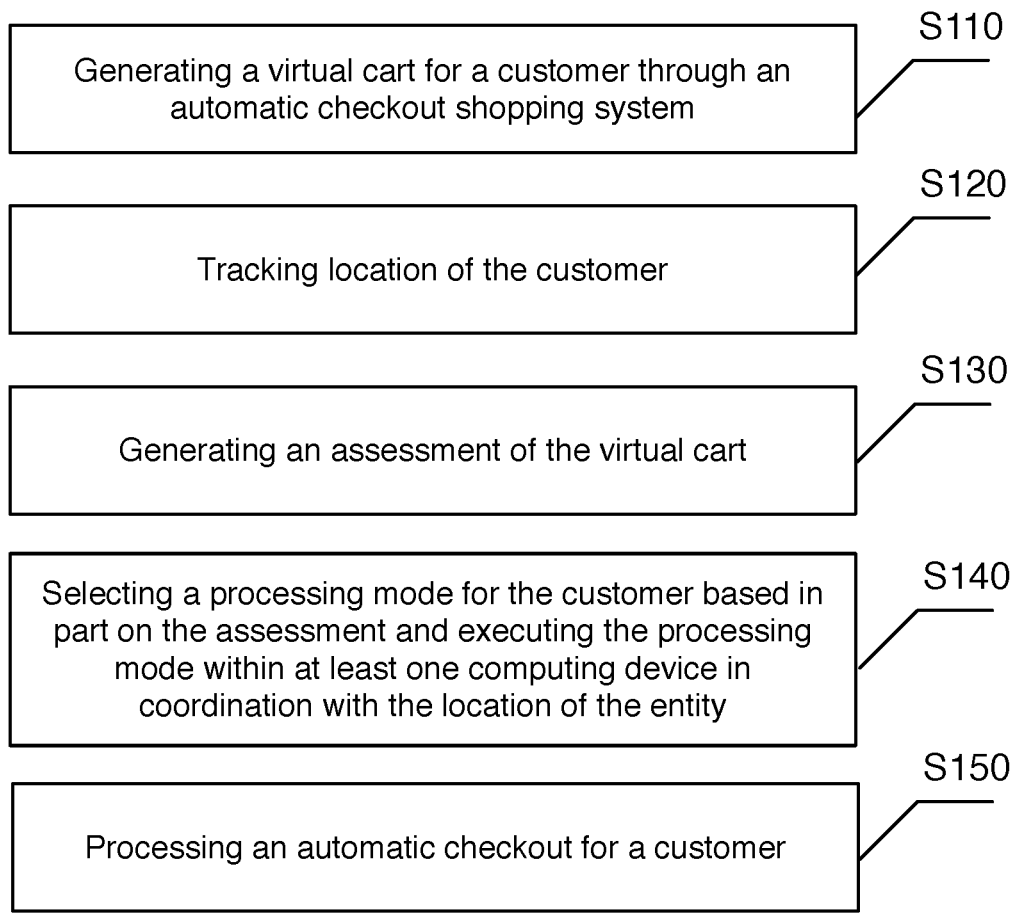
FIG. 19 is a flowchart representation of a method of a preferred embodiment applied to automatic checkout enabled environment.
Figure 20:
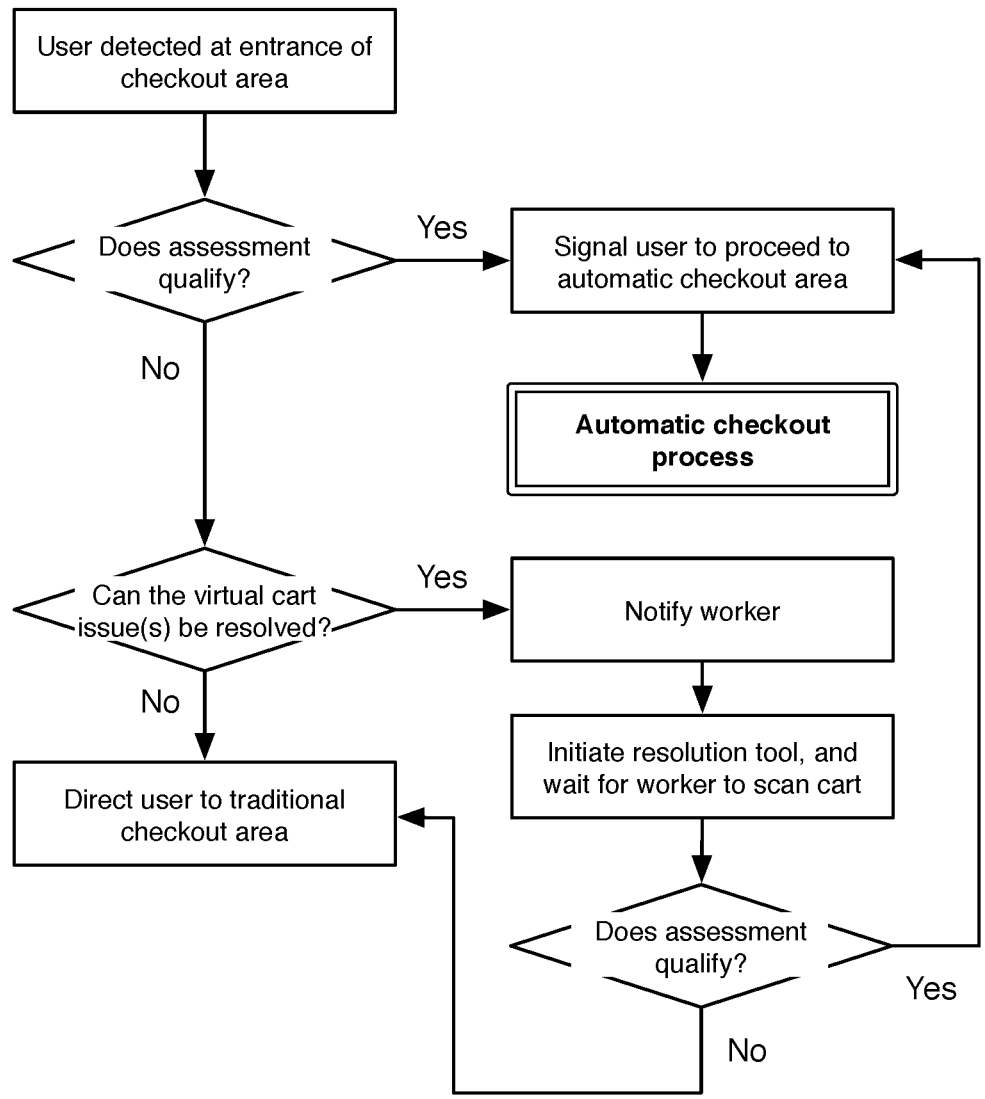
FIGS. 20 and 21 are exemplary logical flowcharts of an implementation of a method of a preferred embodiment.
Figure 21:
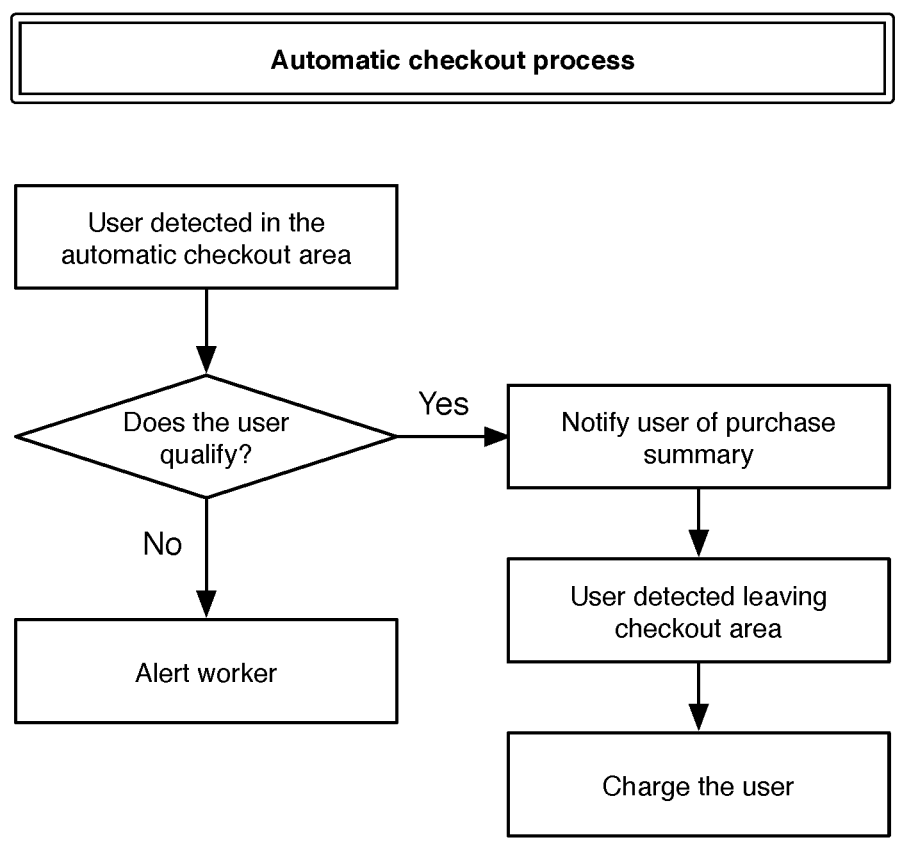

As shown in FIG. 19, a variation of the method for dynamically directing a customer checkout experience within an automated shopping environment of a preferred embodiment may more specifically include generating a virtual cart for a customer through an automatic checkout shopping system S110, tracking location of the customer S120, generating an assessment of the virtual cart S130, and selecting a processing mode for the customer based in part on the assessment and executing the processing mode within at least one computing device in coordination with the location of the entity S140. The automatic checkout variation of the method functions to augment processing a customer during checkout process in shopping environment. This may include completing an automatic checkout or a facilitated checkout or triggering actions providing other forms of assistance. As shown in FIGS. 20 and 21 and described herein, various implementations of the method can be used in directing and instructing customers, resolving fixable problems with a virtual cart, providing a responsive and reliable experience to customers (e.g. on demand checkout summaries), alerting the store to improper use, and addressing other issues related to automatic checkout usage. The method is preferably implemented across a set of active customers in the shopping environment. Herein, the automatic checkout variation of the method refers to customer for the sake of clarity, but one skilled in the art could appreciate that customer may additionally or alternatively be other forms of agents in the environment such as carts or baskets.

Block S110, which includes generating a virtual cart for a customer through an automatic checkout shopping system, functions to build a list of items selected by a customer prior to entering the checkout region. The virtual cart can be a predictive model of the items selected by a customer, and, in addition to the identity of the items, the virtual cart may include a confidence level for the virtual cart and/or individual items. The virtual cart is preferably a data model of predicted or sensed interactions. Other variations of the method may have the virtual cart be tracking of the number of items possessed by a customer or detection of only particular item types (e.g., controlled goods like alcohol, or automatic-checkout eligible goods). As shown in FIG. 7, a virtual cart is preferably generated during the shopping experience such that a prediction or expectations for the items selected by a customer is modeled when a customer enters a checkout region.

The automatic checkout shopping system may output or manage a virtual cart model that can be generated from a variety of types of automatic checkout systems such as the systems described above, which may include a CV monitoring system, a wireless item tagging system, a smart shelving system, a smart cart system, a sensor fusion system, user application (e.g., a scanning system for customer assisted entry in the shopping region), human-in-the-loop processing, and/or approach or combination of approaches for generating a record of items to purchase while shopping and executed at a checkout region.

In the CV monitoring system variation, generating a virtual cart can include collecting image data, applying computer vision modeling of item and customer interactions based on the image data, and in response to detecting customer-item interactions, updating a virtual cart. With a smart shelving system, a scale or other shelving based sensors may detect changes in inventory state which can be used to credit item removal events to customer selection of an item.

Generating a virtual cart for a customer may include synchronizing a detected customer with an associative element. With a CV monitoring system this preferably includes associating a CV-person with a user-record and/or a user-account. Primarily, synchronizing associative elements functions to link a tracked entity within the shopping environment with a record that may be associated with payment details, shopping history, shopping lists, account settings, and/other account records. As another option, synchronizing associative elements may be used to coordinate updating the state of user application instances (e.g., customer apps or worker apps) and/or computing devices (e.g., checkout stations or customer-directing infrastructure).

Synchronizing a detected customer with an associative element can include triggering a customer check-in event. A check-in event can occur upon initially detecting a customer for tracking such as when the customer first enters the shopping environment. A check-in event may alternatively occur while the customer is shopping. Similarly, a check-in event may occur when approaching or within the checkout region or during the automatic checkout process.

In one variation, a customer check-in event can be manually triggered by a customer through an application operating on a mobile computing device (e.g., smart phone, smart watch, smart wearable, and the like). An application initiated check-in is preferably communicated wirelessly over the internet. Other forms of a check-in may be through checking-in at a station connected to the automatic checkout shopping system. For example, a station could use NFC, RFID tags, QR or machine readable code readers, biometric scanning, or other suitable check-in mechanisms to check a customer in. Swiping a credit card or entering other payment information could similarly be used as a check-in event. Check-in stations can be positioned at the entrance of a shopping environment, throughout the shopping environment, and/or the checkout region.

In the variation where a customer has selected items prior to a check-in event, a virtual cart may be generated and tracked proactively. The virtual cart is preferably part of a user-record that can be associated with a CV-person. The user-record can function as ephemeral account. In some implementations, only customers that check-in may be tracked and monitored for virtual cart generation, but other implementations may automatically track all customers. The virtual cart that was generated for an agent (e.g., a person, a cart, a collection or selected items) and associated with the user record may be later associated with a user-account upon check-in. The virtual cart could alternatively be used in altering the checkout process of a customer even in cases where the customer performing a check-in process. For example, a checkout station could be associated with a CV-person through a proximity condition (e.g., nearest CV-person to the checkout station) and the virtual cart automatically entered in the checkout station to avoid manual entry of items.

As one implementation, associating an "anonymous" virtual cart with an user-record and/or user-account can include linking through a CV-based processing. An anonymous virtual cart herein refers to a virtual cart generated by tracking a selection of goods by a customer and/or other type of agent without or prior to having an explicit association with an identified customer. CV-based linking can be used to link an application session of a user-record or user account to a virtual cart representing the physical tracking of a cart or selection of items.

In one variation, linking through a CV-based processing may include requesting an image of a customer's current cart or item selection, receiving a customer supplied image of the customer's current cart or item selection, and matching the customer supplied image to a virtual cart generated in the automatic checkout system. Carts will generally be substantially unique such that the contents of a cart can be used as a pairing mechanism. For example, while shopping a customer may decide to enable automatic checkout. The customer can check-in through an app and direct their camera toward their cart. The visual image of that cart can then be processed to identify some portion of the contents so as to be paired with a corresponding virtual cart associated with a user-record and generated by the automatic checkout system. In another variation, other actions may be directed to complete the linking. For example, a customer may be directed through an application (that is preferably associated with a user-record or a user-account) to perform a gesture such as waving. Identification of that gesture by an observed CV-person can result in linking that account to a nearby or associated virtual cart. The directed gesture may be changed based on other customers trying to link with a virtual cart.

In another variation, biometric CV-based linking may be used. Preferably, a biometric signature or visual information to form a biometric signature can be established for an account. An imaging system in the shopping environment can then perform biometric identification and matching of customers and an account. In this way, a customer checking-in to a store location can be linked to a tracked virtual cart by using biometric CV identification of a user. For example, facial recognition of a customer based on a profile photo of a customer may be used. Additional or alternative forms of biometric identification may be used such as gate analysis. Biometric identification can be used to associate to a user-account, but may additionally or alternatively be used to facilitate tracking a CV-person through a store so that a single user-record can be maintained for that CV-person. Personal identifying features such as biometric properties as well as clothing, gait analysis, and/or other properties can be used in unifying tracking of a customer.

In another variation, local data communication transmitted by a mobile device can be a mechanism used in linking an application session and account with a particular virtual cart. In one implementation, wireless data transmission can be sent to a receiver of a smart cart or other device may be used by the automatic checkout system. For example, a mobile device may be able to use NFC, an RFID tag, and/or audio tone id to check-in at a smart cart. Displaying a QR code to a camera of a smart cart could similarly be used. In another limitation, a visual signal may be transmitted to an imaging system (e.g., a surveillance) of a CV-based automatic checkout system. For example, a mobile app may cause a light to flash with an identifiable pattern that can be identified by the imaging system of the shopping environment. Similarly, an audio tone may be played and detected by a system of the shopping environment.

In an alternative implementation, the location of the customer may be detected using a positioning system, and that position can be compared to location of a CV-person and/or a detected location of items associated with a virtual cart. Various alternative approaches for synchronizing a virtual cart and a customer may be used. In some implementations, multiple approaches for linking could be used in combination.

Customers may additionally be automatically checked-in using various approaches such as those discussed above. In some case, geo-fencing, mobile device detection, biometric detection, and/or other techniques may be used. In some cases, automatic check-in could be a configurable setting of an account. For example, some account may enable automatic check-in but others may set their account to require explicit check-in by a customer.

The method may limit generation of a virtual cart to customers successfully associated with an account. For example, a customer that checks-in on an app upon entry or a customer that registers for automatic check-in (e.g., via geo-fencing, biometric sensing, NFC, and the like) will be tracked and eligible for automatic checkout processing, and customers that do not check-in will not be actively tracked and won't be eligible for automatic checkout processing. More preferably, each customer is automatically tracked while within the shopping environment, which can enable associating the tracked customer with an account during the shopping experience and/or during the automatic checkout process. Automatic tracking of all present customers can further enable customers to use automatic checkout without setting up an account by simply paying for the generated virtual cart, where the customer pays through existing channels such as paying cash or with a credit card at a checkout station.

Block S120, which includes tracking location of the customer, functions to assist in synchronizing assessment and/or processing of a checkout process. Preferably, tracking location of the customer can include detecting the customer in a checkout region, which can be used to initiate a process of interacting with a customer and directing various components to complete a smooth checkout experience for all customers. As some variations of possible checkout experiences may not depend on an explicit checkout region, location may be tracked across the environment and used when checkout processing is initiated.

The checkout region is preferably a defined region in or near the shopping environment. The checkout region is preferably distinguished as a region where a checkout process can be executed. In a simple version, a checkout process is initiated as the customer enters the checkout region. In an alternative version with a larger checkout region, different stages of the checkout process can be triggered by detecting a customer entering, near, and/or within the checkout region.

Herein, we discuss the customer as the tracked agent but one can appreciate that a cart, basket, collection of products, or any suitable alternative object(s) may similarly be tracked. Tracking a customer or item through the store can use CV-based tracking, but may alternatively use various location positioning systems such RF triangulation, GPS, audio-based location detection, and/or other suitable systems. In some scenarios, the tracked customer may be associated with a user-account, but may alternatively be a treated as an anonymous virtual cart with only a user-record.

In one variation, a system can default to directing customers to a traditional checkout aisle—the system may activate automatic checkout option for only qualifying tracked customers. In this way, not all customers must be actively tracked all the time, and only a subset of tracked customers identified in the checkout region may be analyzed for access to an automatic checkout region. In some cases, a customer may qualify for automatic checkout, but never have created an account or even have previously used the system. Such a customer can be notified of the automatic checkout option by activating a controllable sign, directing a worker to notify the customer, communicating a generated virtual cart to a traditional, facilitated checkout station, and/or using an alternative communication approach. Such a customer could complete the automatic checkout process by paying. In one implementation, a kiosk is available in the automatic checkout region for such customers to simply pay by entering a payment card or paying by cash. In a similar implementation, an automatic checkout system may be operated within a shopping environment, but without having any form of user-accounts, and wherein virtual carts are automatically entered into a checkout station so that qualifying customers/virtual carts can experience a faster checkout process by the items being automatically entered. In another example, of agent monitoring being applied without having full automatic checkout, the method may be applied to dynamically direct customers to checkout stations that balance the queues of checkout stations, wait time of customers, and/or workload of workers.

In some cases, detecting the location of a customer may simply include detecting a signal indicating a particular customer is in the proximity of the checkout region. For example, a smart cart may emit a signal (RF, IR, audio, etc.) that is detected by a receiver in the checkout region. Conversely, transmitter at the checkout region may emit a signal detected by a smart cart or other suitable device.

Block S130, which includes generating an assessment of the virtual cart, functions to analyze the conditions relating to a virtual cart and determine how to direct a checkout process of a customer. The assessment is preferably based on the virtual cart but can additionally be based on purchase history, customer profiles, cost-benefit analysis, item conditions, and/or other factors. The assessment can be performed when a customer is at or near the checkout region but may alternatively be periodically or continuously updated in combination with generating the virtual cart.

The scope of assessment can include receiving data input relating to a particular virtual cart and/or customer. However, the scope of an assessment may additionally or alternatively use as input other current or previous virtual carts, current or previous itemized purchase records, customer data of other currently present, customer data of a store, store data, chain of store data, and/or any suitable scope of data. In this way, assessment may be configured or applied that considers various factors. For example, the virtual cart may be initially processed according to confidence of the automatic checkout system and then processed for anomaly detection based on historical records of all purchase records.

Generating an assessment of the virtual cart can include processing confidence levels of the virtual cart as shown in FIG. 7. Processing confidence levels of the virtual cart can include processing confidence levels for particular items and/or processing confidence levels for the overall virtual cart. In one variation, a virtual cart can be assessed as unqualified for automatic checkout if the confidence level for any one item is below a threshold. Different confidence level thresholds can be set for different items. In another variation, a confidence level can be generated for the overall virtual cart.

Generating an assessment of the virtual cart may include augmenting the confidence of the virtual cart, which may include adjusting one or more confidence levels for customer loyalty, shopping history of the customer, shopping history of various customer populations (e.g., similar customers, all customers from all locations of a store, customers at a particular store location, etc.).

Generating an assessment of the virtual cart may additionally include processing a cost-benefit impact of issues in a virtual cart, which functions to factor in value of customer experience and customer retention. While one likely driver of the method is to ensure confidence that customers are charged for the items selected for purchase, certain problems with a virtual cart may be insignificant enough to warrant disturbing the automatic checkout process. Processing of a cost-benefit impact can enable the method to adjust an assessment based on the relationship of a financial impact and at least another metric such as long-term value of a customer. The processing of a cost-benefit impact may be a condition based on a configured heuristic-based rule. For example, if a customer has shopped at least a certain number of times in the last year and the possible financial loss is below a certain amount then automatic checkout may be allowed. Processing cost-benefit impact may alternatively use machine learning, statistics, or other algorithmic approaches.

The cost benefit impact will preferably depend at least partially on the customer history but may additionally or alternatively depend on the type of items in question, the crowd level in the store, and/or other factors. Frequent shoppers may be biased toward one form of assessment, and new shoppers may be biased toward another form of assessment. Similarly, high value shoppers may be biased toward one form of assessment, and low value shoppers may be biased toward another form of assessment.

Additionally, processing of a cost-benefit impact may trigger updating a virtual cart based on a conclusion of the cost-benefit analysis. This may include setting particular items or item prices in the virtual cart to reflect how their purchase was processed. In one example, the automatic checkout guidance system may not be able to determine if a bottle is one of two different varieties. One may be slightly more expensive. If the processing cost-benefit impact indicates that the price difference is not significant enough to prevent an automatic checkout, then the cheaper of the two varieties may be selected and that price is used (even though the user may actually have the more expensive version). The setting of a price based on virtual cart assessment can be used to deflate prices (e.g., to avoid over charging), inflate (e.g., to avoid loss of revenue), or set in any suitable manner.

Figure 22:
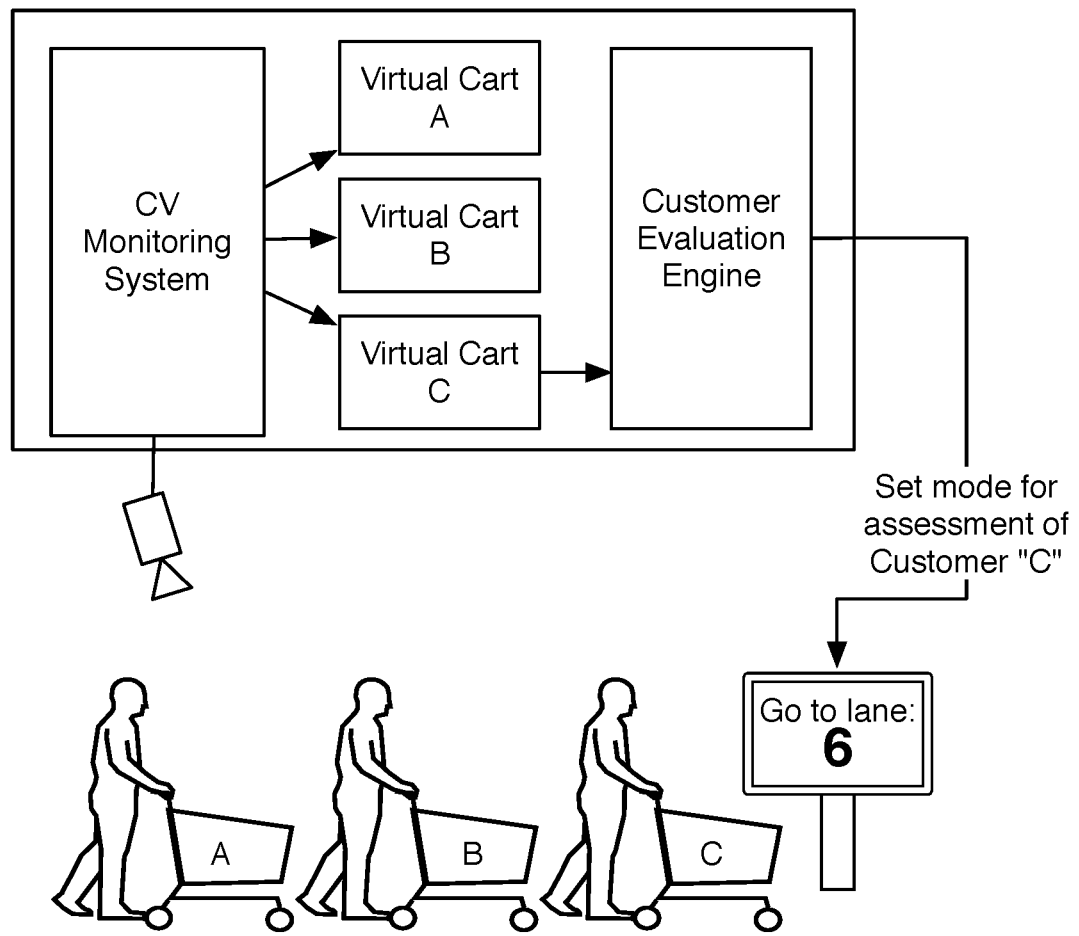
FIG. 22 is a schematic representation of coordinating execution of a processing mode at a computing device with the location of the customer.

Block S140, which includes selecting a processing mode for the customer based in part on the assessment and executing the processing mode within at least one computing device in coordination with the location of the agent functions to direct or control at least some portion of a checkout process for a customer. Preferably block S140 includes activating at least one checkout guidance tool based on the state of the virtual cart of a customer. The checkout guidance tool is preferably activated in coordination with the detection of a customer in a checkout region as shown in FIG. 22. Different types of computing devices involved in the checkout process can be controlled in different ways to facilitate different aspects such as customer direction, worker direction, item entry for purchase, execution of a checkout-related transaction, and/or other aspects.

The processing modes preferably include at least an automatic processing mode and a facilitated processing mode. In some variations, the processing modes can include an automatic processing mode, a semi-automatic mode, and/or traditional checkout mode, but any suitable combination and set of processing modes may alternatively be used. Various actions may be triggered depending on the assessment and the selected processing mode including directing a customer to one of at least two possible checkout processes, triggering a cart issue resolution tool, and/or processing an automatic checkout.

Selecting a processing mode preferably involves checking the conditions of the assessment and selecting the processing mode mapped to the current conditions. Additional aspects may be considered in the conditions. For example, the number and/or location of customers, the number of customers currently using checkout stations, the number and/or location of workers, and/or other factors.

Figure 23:
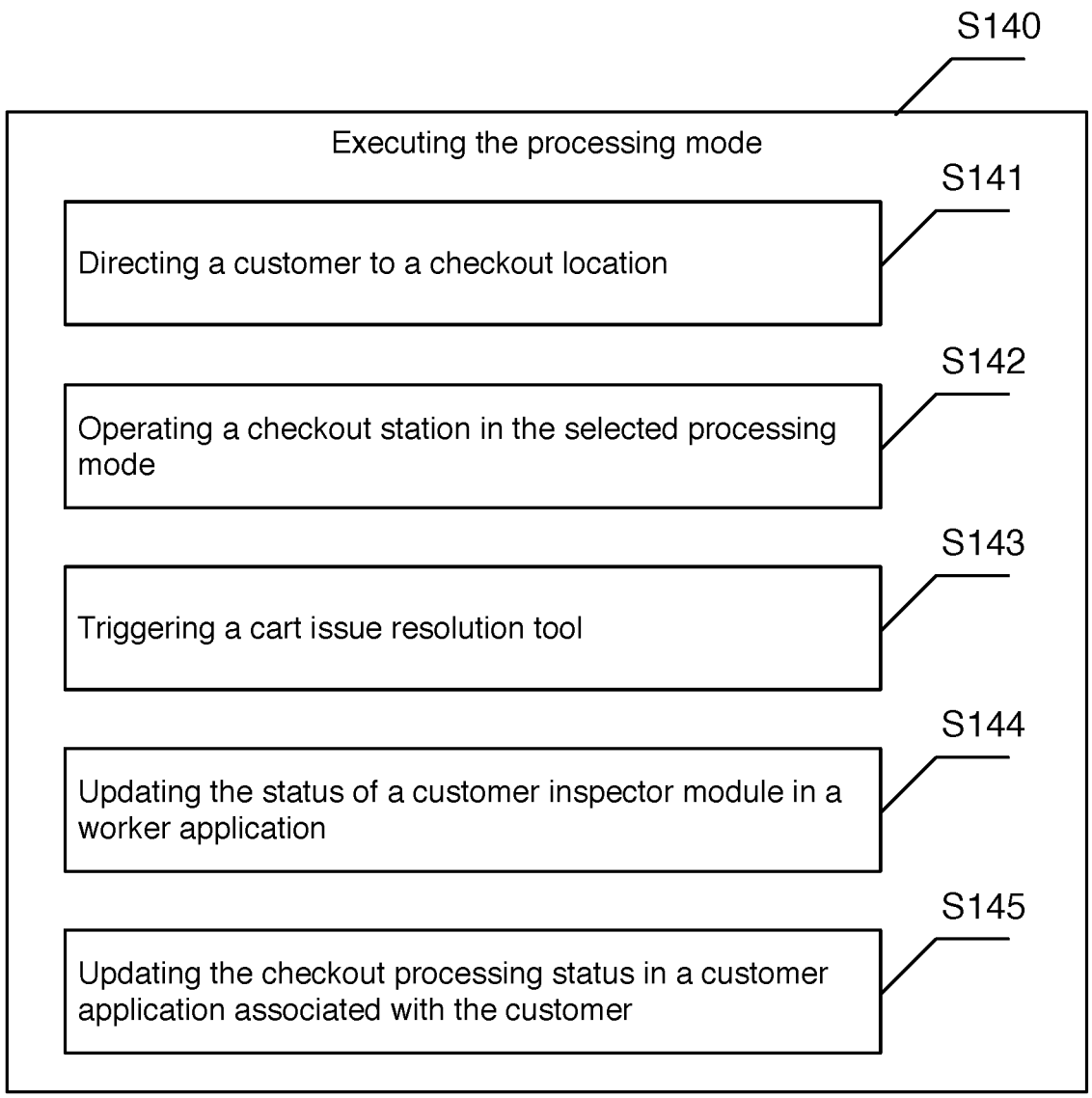
FIG. 23 is a flowchart representation of variations of executing a processing mode.

Selecting a processing mode and executing the processing mode can be applied in a variety of ways to augment the checkout process. In some variations, block S140 may include directing a customer to a checkout location S141, operating a checkout station in the selected processing mode S142, triggering a cart issue resolution tool S143, updating the status of a customer inspector module in a worker application S144, and/or updating the checkout processing status in a customer application associated with the customer S145 as shown in FIG. 23. In some variations, the checkout process may be augmented in only one mode. Alternatively, multiple modes may be augmented. For example, activating a checkout guidance tool comprises directing a customer to a checkout location through customer-directing infrastructure, activating a processing mode within a checkout station, and updating a worker application.

In one variation, executing the processing mode comprises directing the customer to a checkout location S141, which functions to communicate an instruction to a customer. Directing a customer is preferably used to tell a customer where to go to complete a checkout process. There are preferably at least two possible checkout locations. In some cases this may be direction to a specific device or checkout aisle. In other cases, this may be identifying the type of eligible checkout options. Directing a customer to one of at least two possible checkout processes preferably involves directing a customer that qualifies based on the assessment to an automatic checkout region or directing a customer to a facilitated checkout process. The automatic checkout region may include checkout stations that could facilitate payment and other functionality, but in some cases, the automatic checkout region can enable a customer with an associated user-account and payment mechanism to walk out of the store to complete a purchase. Directing a customer can include activating a controllable infrastructure element (i.e., customer-directing infrastructure) such as a sign, a turnstile, a pathway, or any suitable infrastructure element. Accordingly, directing a customer can include updating a visual display, playing an audio instruction, or communicating instructions in any suitable manner. Directing a customer can alternatively include notifying a worker or a customer within an application. In one implementation, a worker is stationed near the entrance of the automatic checkout region and is instructed through a worker application how to direct customers.

Directing a customer is preferably used to assist in managing customers of a store where a portion of customers qualify for automatic checkout and another portion do not (either by choice or because of an issue). Clear direction may remove customer confusion surrounding use of automatic checkout. In addition to or as an alternative to use for an automatic checkout process, the method may be used to direct customers to particular aisles as an attempt to optimize or enhance efficiency of facilitated checkout processes. This customer direction can be applied in store environments that only use traditional facilitated checkout processes. Two common approaches are commonly used today in organizing customers. The first is for customers to self-select an aisle (where they usually try to guess the fastest aisle). The second is for customers to form one line and then for workers to call customers to their checkout station individually. The method may be used to direct users based on an understanding of possessed items, customer history, and other factors to proactively balance customers across different checkout stations.

In one variation, executing the processing mode in a computing device may include operating a checkout station in the selected processing mode S142. The virtual cart or other data collected by the automatic checkout system can be used to enhance the use of a checkout station for the worker and/or customer.

Figure 24:
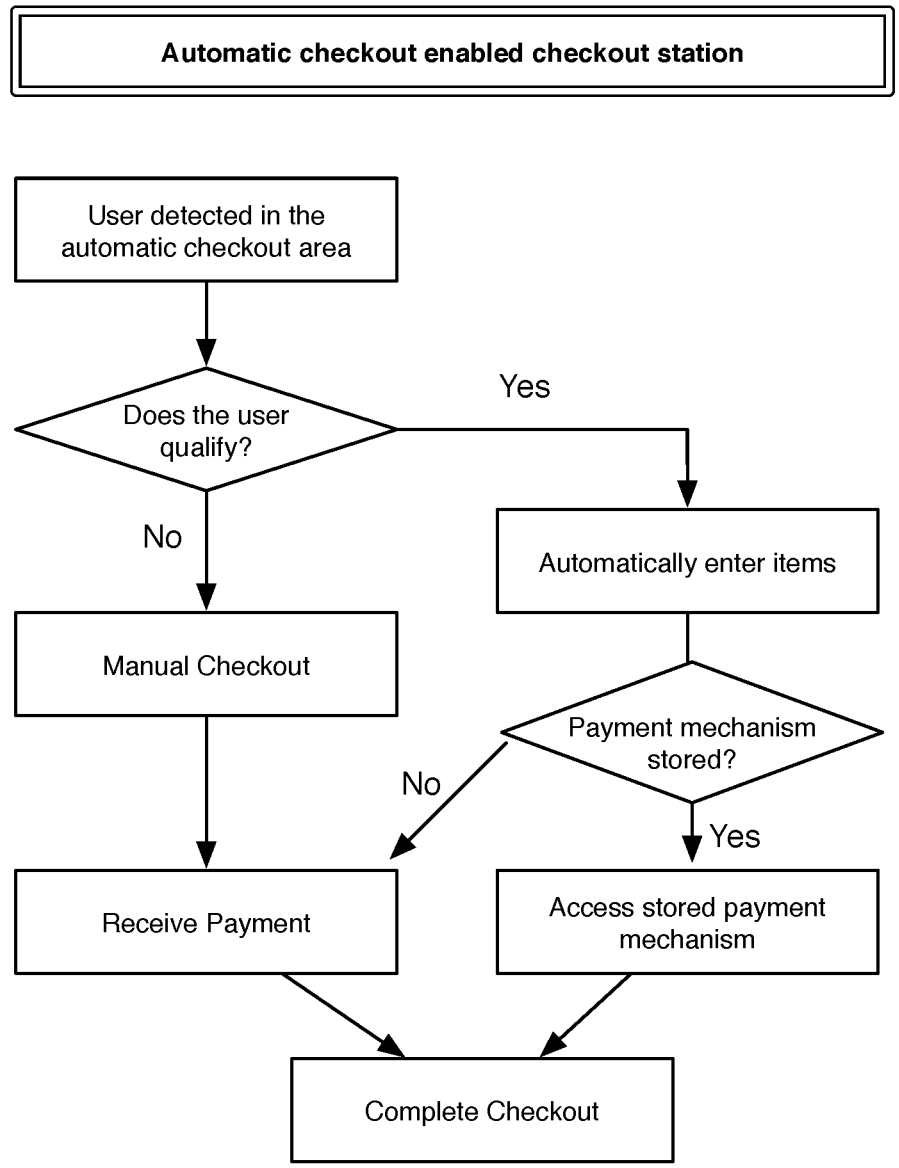
FIG. 24 is an exemplary logical flowchart of an implementation of the method in combination with a checkout station.

An implementation that enables dynamic processing of a customer by a checkout station based on the virtual cart assessment may have particular relevance in situations where automatic checkout is more transparently implemented. For example, such an implementation may be implemented without user managed user-accounts or customer-facing applications. Customers at a store that have satisfactory virtual carts detected could experience faster checkout experiences. For customers with qualifying assessments, the checkout process may be enhanced through automatic entry of items into a checkout station and/or automatic entry of payment mechanisms as shown FIG. 24. The faster checkout of one customer may also improve the checkout experience of other customers since they have shorter waits.

In one variation, the virtual cart of a customer can be queued up for a particular assisted checkout station. Alternatively, the automatic checkout system or an alternative system may track a user or a basket as they approach an assisted checkout station. The current state of the virtual cart is synchronized with the checkout station. Information collected at the checkout station is then used in combination with that of the automatic checkout system and/or virtual cart.

Operating a checkout station in a selected processing mode may additionally involve synchronizing a customer and its respective virtual cart with control of a particular checkout station. A store will generally have multiple checkout stations and multiple customers and so the method can facilitate mapping the appropriate customer to the appropriate checkout station. In one variation, the virtual cart of a customer can be queued up for a particular assisted checkout station. Alternatively, the automatic checkout system or an alternative system may track a customer or a basket as they approach an assisted checkout station. An association between the checkout station device and a CV-person established based on proximity, contact, interaction (e.g., customer touching the checkout station) or other physical attributes could be established and used to coordinate control of a selected checkout station with an appropriate virtual cart. In another variation, a set of possible virtual carts could be presented within a user interface of the checkout station (e.g., the five virtual carts of customers waiting in line), and a worker could select the current virtual cart.

The processing mode is preferably selected from a set of processing modes that includes at least an automatic checkout mode. An automatic checkout mode executed in a checkout station preferably includes at least automatically entering items of the virtual cart in a checkout station. In one implementation, the checkout stations are directly controlled devices. In another implementation, an interface to the checkout stations facilitates automatically entering the items of a virtual cart. For example, a simulated barcode scanner could sequentially enter the product codes of each item in fast succession, which may be interpreted by a checkout station as a fast series of barcode scans. Automatic checkout mode may additionally include application of an associated payment mechanism for processing the transaction of the automatic checkout process. For example, a credit card record associated with a user-account may be used to pay for items of a virtual cart. The credit card record could be communicated to the checkout station. Alternatively, such transaction may occur remotely. Other payment methods such as cash, credit card, debit card, and others generally accepted at checkout stations may also be used.

The set of processing modes may additionally include a manual checkout processing mode wherein a virtual cart is not used or may not be available. In this mode the checkout station can operate in a traditional manner such as by allowing manual entry of items for checkout processing.

The set of processing modes may additionally or alternatively include an assisted checkout processing mode. An assisted checkout processing mode may at least partially augment entry of items based on the virtual cart. This can involve entering a partial list of items, highlighting a subset of items to check, biasing the entry of items so that it is more efficient, supplying the payment mechanism of a customer automatically, supplying the loyalty program customer identifier automatically based on the user-account of a customer, or augmenting the checkout process in any suitable manner. An assisted checkout processing mode can function to accelerate a partially manual checkout process.

Related to assisted checkout, in some variations, a customer may be directed to use an assisted checkout station (e.g., one dedicated to the use of resolving virtual cart issues). Some checkout stations may be dedicated to particular types of checkout processes. In one exemplary implementation, a customer may be directed to a checkout station for assisted checkout processing, the customer may be asked to transfer items from their cart into a second cart. The assisted checkout station may include a number of cameras or other elements to collect information as items are transferred. In one instance, the assisted checkout station can promote ideal conditions for automatically detecting items selected by a customer by removing possibilities of blocked line of site, poor image quality of an item, confusion around customer possessions in a cart (e.g., a jacket), and/or other conditions that may present challenges for a self-checkout system.

At least a subset of the items selected by the customer can be rescanned. An assessment of the virtual cart can be updated during the checkout process and signal when the virtual cart qualifies for completing the checkout process. For example, a virtual cart may have low confidence for only three out of ten selected items. The customer or worker may facilitate scanning of the ten selected items but the checkout process can be completed after the three items with low confidence have been scanned.

In one variation, executing the processing mode in a computing device may include triggering a cart issue resolution tool S143, which functions to initialize resolution of an issue in a virtual cart with identifying one or more items selected by a customer. Triggering a cart issue resolution tool may include prompting a worker to facilitate inspection of a customer's cart. In one variation triggering a cart issue resolution tool may include guiding inspection of the physical items. A notification may be communicated to a worker application/device. A worker application may display a characterization of the issue with the cart of an identified customer. Issues can include an unknown item in a cart, unknown quantity of a particular item, confusion on the identity of an item, need for additional worker action (e.g., weighing produce, checking ID, etc.), and/or any suitable problem. A cart issue resolution tool may generate a questionnaire with particular checks to be completed by a worker. The automatic checkout shopping system preferably facilitates updating the virtual cart based on information provided through the questionnaire. The set of checks may be a minimized number of checks to satisfy an assessment requirement. The set of checks may be additionally updated during the inspection process based on reprocessing of the virtual cart. A customer version of a generated questionnaire could similarly provide a number of checks to be completed by a customer within a customer application. As the customer may be an untrusted party, the customer version may include a first set of checks for collecting item information to improve the confidence in the virtual cart and a second set of checks to verify the level of trust to place in the responses of a customer. Additionally, the customer may be directed to perform actions such as hold an item, place an item on a surface, and/or other actions that facilitate the agent monitoring system to update the virtual cart with additional data collected during those actions.

In one variation, triggering a cart issue resolution tool may additionally include activating an augmented reality inspection tool, which functions to present information in an augmented reality format. The augmented reality inspection tool is preferably used by a worker to visually inspect and resolve issues with a cart. For example, unidentified items in a cart may be highlighted in a display-based, wearable, or projector-based augmented reality device. The augmented reality inspection tool could additionally facilitate collection of additional visual data used by a CV-based automatic checkout system in improving the confidence of a virtual cart.

In one variation, executing the processing mode can include updating the status of a customer inspector module in a worker application S144. A customer inspector module preferably communicates or otherwise reflects the virtual cart and processing mode for a customer. For example, a customer inspector module may update to show checkout status and/or any checkout issues as customer approach a worker. This can be used to highlight customers that should not be using automatic checkout. This may be used to enable workers to appropriately direct customers. This may be used to allow a worker to assist a customer with the checkout process.

In another variation, executing the processing mode can include updating the checkout processing status in a customer application associated with the customer S145. The customer application is preferably installed as an application instance on a customer managed computing device such as a smart phone, a smart wearable, and the like. A customer application may reflect the current state of the virtual cart. In some cases, issues with a virtual cart may be highlighted and may be addressed within the customer application. In other cases, the customer application may communicate various directions. For example, the customer application may specify the customer should talk to a customer care worker or to go to a checkout station to complete a checkout.

The method may additionally include processing an automatic checkout for a customer S150 which functions to complete the transaction. The method is preferably used to facilitate the charging of a customer for goods. Here charging preferably includes charging a credit cart, debit card, deducting a virtual currency, or charging a suitable account. The method can include notifying a customer to a pending or executed transaction. The transaction may include a list of the total and the set of items included in the total. Adjustments or assumptions that were made based on cost-benefit analysis may be indicated in a summary. In one variation, the checkout summary may be sent to a customer when or after a customer exits the automatic checkout region. Adjustments or issues may be resolved in the summary within a wait period defined by some time period and/or within a geofenced region. The actual financial charge may be initiated after the wait period. The method may similarly be applied for managing or crediting an account for non-financial transactions. For example, a library, warehouse, an equipment facility, or any suitable storage facility may use the system for accounting for the removal (and addition) of items. In some variations, an account check-in event is reserved for completion during checkout. Accordingly, the method can support directing customers to complete an automatic checkout process by checking-in. In one implementation, automatic checkout station (which may also operate as assisted checkout station), where a user may check-in (using NFC, RFID tagging, entering account information, biometric recognition, and the like) and/or simply pay for the total of the virtual cart. Support for simple payment without setup of an account may be attractive to particular users. Worker-based stations could similarly facilitate such payment and automatic checkout.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for processing a checkout transaction for a customer while in an environment comprising:
    collecting image data from a computer vision monitoring system with a plurality of imaging devices within the environment;
    generating a virtual cart for the customer through an automatic checkout system, wherein generating the virtual cart for the customer is comprised of, at the computer vision monitoring system, applying computer vision modeling of item and customer interactions to the image data, and in response to detecting customer-item interactions updating the virtual cart, wherein the virtual cart is a data record representing a physical cart associated with the customer;
    detecting location of the customer in proximity of a checkout kiosk, wherein detecting the location of the customer is detected at least in part through processing of the image data by the computer vision monitoring system and determining that the customer is inside a subregion of the environment near the checkout kiosk;
    in response to detecting the location of the customer in proximity to the checkout kiosk, automatically transferring the virtual cart to the checkout kiosk;
    generating an assessment of the virtual cart for checkout processing;
    selecting a processing mode for the customer from a set of processing modes that includes at least an automatic checkout mode and a facilitated checkout mode, wherein selecting the processing mode is based in part on the assessment; and
    operating the checkout kiosk in the selected processing mode when the location of the customer is in proximity of the checkout kiosk, which comprises, when in the automatic checkout mode, automatically entering items of the virtual cart into the checkout kiosk for checkout processing.

2. The method of claim 1, wherein the automatic checkout system comprises a smart shelving system, and wherein generating the virtual cart comprises, at the smart shelving system detecting changes in inventory state; and updating the virtual cart based in part on changes in inventory state.

3. The method of claim 1, wherein generating an assessment of the virtual cart comprises generating an assessment based on confidence levels of computer vision modeling for individual items in the virtual cart, wherein the assessment is unqualified for the automated processing mode if any one item of the virtual cart has a confidence level below a threshold.

4. The method of claim 1, wherein generating an assessment of the virtual cart comprises generating an assessment based on a cost-benefit impact of issues in a virtual cart, wherein the assessment permits an automated processing mode for the virtual cart when having a potential issue if the financial impact of allowing the automated processing mode is less than a financial threshold.

5. The method of claim 1, further comprising:
    generating a second virtual cart for a second customer through the automatic checkout system;
    detecting location of the second customer in proximity to the checkout kiosk with the customer; and
    wherein operating the checkout kiosk in the selected processing mode comprises combining the virtual cart and the second virtual cart and performing a grouped transaction.

6. The method of claim 1, wherein the facilitated checkout mode is an assisted checkout mode; and wherein operating the checkout kiosk in the selected processing mode comprises, when in the assisted checkout mode, at least partially augmenting entry of items based on the virtual cart, which comprises entering a partial list of items in the virtual cart and highlighting, on a display of the checkout kiosk, a subset of items to check for checkout processing.

7. The method of claim 6, wherein the set of processing modes additionally includes a manual checkout mode; and wherein when in the manual checkout mode, operating the checkout kiosk comprises receiving manual entry of items for checkout processing.

8. The method of claim 7, wherein operating the checkout kiosk in the selected processing mode comprises, when in the manual checkout mode, updating the display of the checkout kiosk and directing the customer to a second checkout kiosk for manual checkout processing.

9. The method of claim 1, wherein the checkout kiosk is a customer operated checkout kiosk station.

10. The method of claim 1, wherein the checkout kiosk is operated by the customer.

11. The method of claim 1, wherein operating the checkout kiosk in the selected processing mode further comprises executing a checkout transaction for the virtual cart.

12. The method of claim 11, further comprising establishing an association between the customer as detected by the computer vision modeling and a payment mechanism stored as part of an account-record; and using the payment mechanism in executing the checkout transaction.

13. The method of claim 12, wherein establishing an association between the customer and the payment mechanism comprises detecting a check-in event performed by the customer.

14. The method of claim 13, wherein detecting the check-in event comprises detecting entering of a credit card into a second station.

15. The method of claim 13, wherein detecting the check-in event comprises receiving an application initiated event for the customer from an application operating on a computing device.

16. The method of claim 12, wherein establishing an association between the customer and the payment mechanism comprises, at the checkout kiosk, reading a machine readable code associated with the account-record.

17. The method of claim 1, further comprising establishing an association between the customer as detected by the computer vision modeling and a payment mechanism stored as part of an account-record; and through a display of the checkout kiosk, directing the customer to proceed with automatic checkout and charging the payment mechanism.

18. The method of claim 1, wherein operating the checkout kiosk in the selected processing mode comprises, when in the facilitated checkout mode, resolving an issue in a virtual cart by identifying an item.

19. The method of claim 1, wherein the checkout kiosk comprises a computer processor, a screen, and at least one credit card reader payment mechanism.

20. A system for checkout processing in an environment comprising:
an automatic checkout monitoring system, the automatic checkout monitoring system comprising a plurality of imaging devices within the environment and at least a first machine with a first computer-readable medium with instructions configured to:
collect image data from the plurality of imaging devices,
generate, through application of computer vision modeling of item and customer interactions to the image data, a virtual cart of a customer in an environment, and
detect, through processing of the image data, a customer in proximity to a checkout kiosk and thereby determine that the customer is inside a subregion of the environment near the checkout kiosk;
an evaluation engine comprising a second machine with a second computer-readable medium with instructions configured to generate an assessment of the virtual cart; and
a checkout kiosk positioned within the environment and in communication with the automatic checkout monitoring system that, in response to the detection of the customer in proximity to the checkout kiosk, receives, from the automatic checkout monitoring system, a transfer of the virtual cart and operates in a checkout operating mode based in part on the assessment, and wherein the checkout kiosk comprises at least two selectable checkout operating modes that include an automatic checkout mode and a facilitated checkout mode, wherein when in the automatic checkout mode, the checkout kiosk automatically enters items of the virtual cart for checkout processing.

21. The system of claim 20, wherein the automatic checkout monitoring system comprises a computer vision monitoring system with a plurality of imaging devices within the environment.

22. The system of claim 20, wherein the automatic checkout monitoring system comprises a smart shelving monitoring system.

23. The system of claim 20, wherein the checkout kiosk further comprises instructions configured to automatically enter items from the virtual cart into the checkout kiosk when in the automatic checkout mode.

* * * * *